United States Patent [19]
Takeuchi et al.

[11] Patent Number: 5,968,623
[45] Date of Patent: Oct. 19, 1999

[54] CYLINDRICALLY SHAPED ARTICLE, METHOD OF MANUFACTURING SAME AND FILM FOR IMAGE FORMING APPARATUS

[75] Inventors: Kazutaka Takeuchi; Shoichi Shimura; Hideyuki Hatakeyama, all of Yokohama, Japan

[73] Assignee: Canon Kabushiki Kaisha, Japan

[21] Appl. No.: 08/774,496

[22] Filed: Dec. 30, 1996

[30] Foreign Application Priority Data

Jan. 11, 1996 [JP] Japan ..................................... 8-002797

[51] Int. Cl.⁶ .................................................. B29D 23/00
[52] U.S. Cl. .................... 428/36.91; 428/36.6; 428/36.9; 264/250; 264/299; 264/309; 264/319; 264/DIG. 76
[58] Field of Search .............................. 428/36.91, 36.6, 428/36.9; 264/250, 299, 309, 319, DIG. 76

[56] References Cited

FOREIGN PATENT DOCUMENTS

| | | |
|---|---|---|
| 63-34120 | 2/1988 | Japan . |
| 63-34121 | 2/1988 | Japan . |
| 63-313182 | 12/1988 | Japan . |
| 3-25477 | 2/1991 | Japan . |
| 3-266870 | 11/1991 | Japan . |
| 4-9989 | 1/1992 | Japan . |
| 4-292680 | 10/1992 | Japan . |

Primary Examiner—Jose' G. Dees
Assistant Examiner—Michael A. Williamson
Attorney, Agent, or Firm—Fitzpatrick, Cella, Harper & Scinto

[57] ABSTRACT

Provided is a method of manufacturing a cylindrically shaped article, wherein a thermoplastic layer is formed on the surface of the cylindrically shaped article precisely and at low cost. To achieve this, the outer peripheral surface of a cylindrically shaped article supported on a columnar member is coated with particles of a thermoplastic resin, a tubular molding member is fitted on the cylindrically shaped article coated with a film of the particles of thermoplastic resin, and at least the columnar member is then heated to calcine the thermoplastic resin film.

12 Claims, 20 Drawing Sheets

FIG. 1
FIG. 2
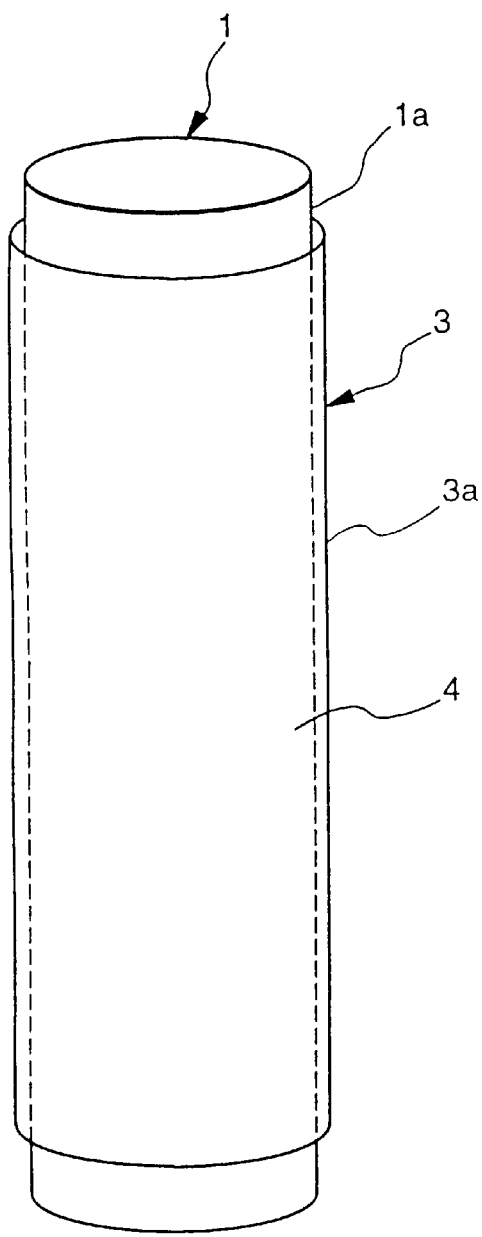
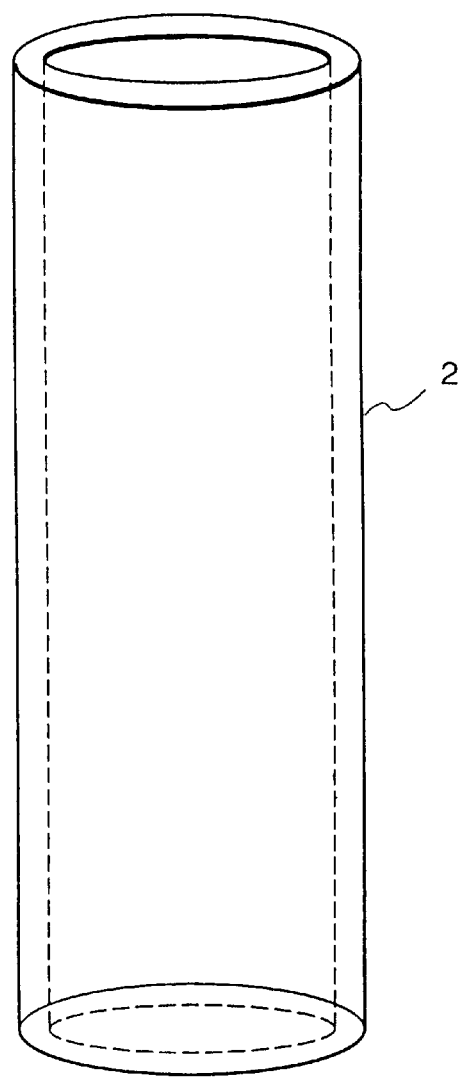

FIG. 15
FIG. 16
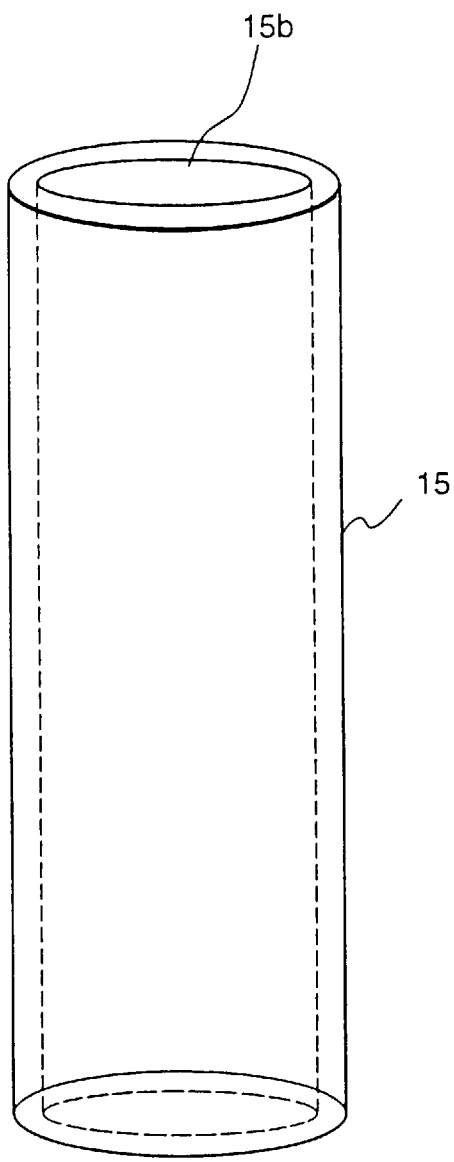
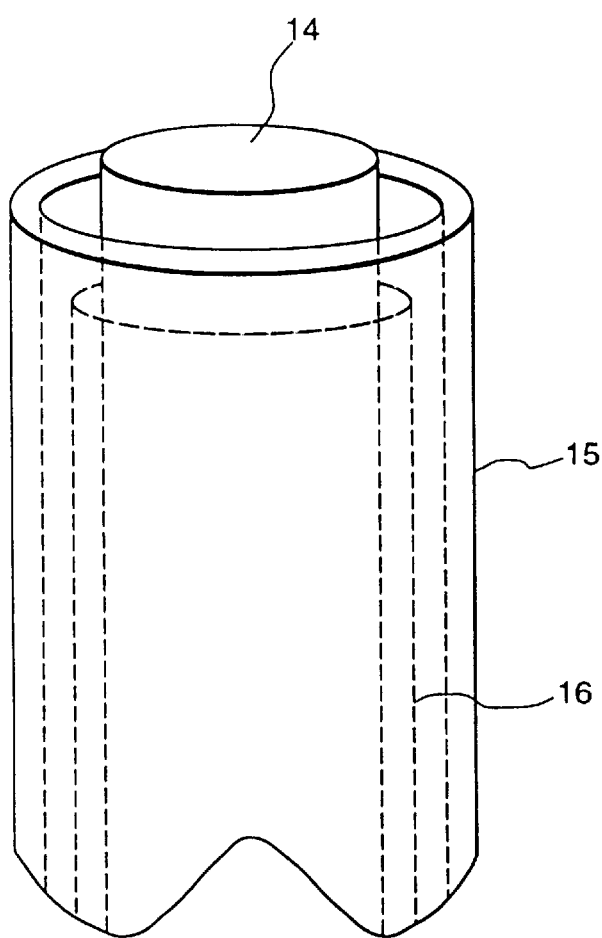

FIG. 17
FIG. 18
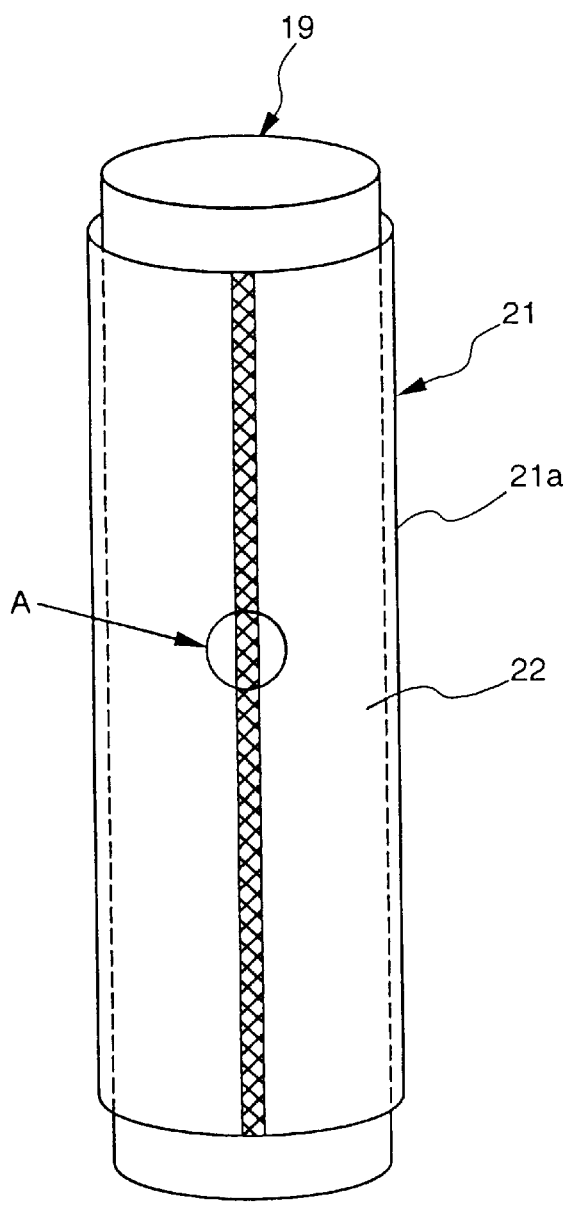
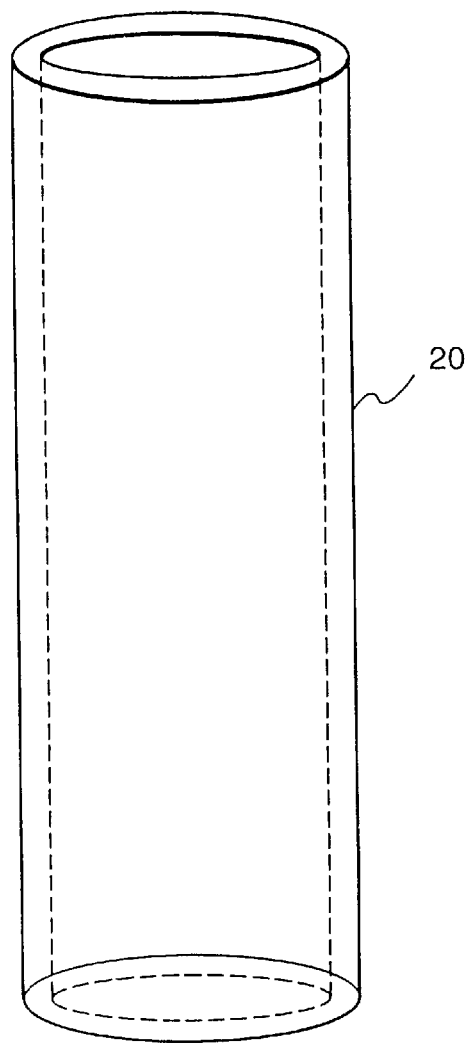

1

CYLINDRICALLY SHAPED ARTICLE, METHOD OF MANUFACTURING SAME AND FILM FOR IMAGE FORMING APPARATUS

BACKGROUND OF THE INVENTION

This invention relates to an annular, tubular, columnar, ring-shaped and belt-shaped cylindrical article such as a conveyor belt used to convey precision parts to a predetermined location while maintaining a high degree of positional accuracy, or a sealed package for packaging and accommodating an article. The invention further relates to a method of manufacturing the cylindrical article. The principal field in which the invention is utilized resides in application of the article as the functional component of an image forming apparatus.

More particularly, the invention provides a method of forming a fluoroplastic film on a tubular film used as a cylindrically shaped article and relates to use of this article as a fixing member for image formation.

The following methods of forming a fluoroplastic film on the inner peripheral surface or outer peripheral surface of an article (especially a tubular film made of resin) having a cylindrical shape are known in art:

(1) A method of applying a coating by a process such as spray coating or dip coating for applying fluoroplastic particles or a solution in which fluoroplastic particles have been dispersed, drying the solvent and applying heating to calcine the fluoroplastic film.

(2) A method of covering the outer side of a cylindrically shaped body with a heat-shrinkable fluoroplastic tube and then heating the entirety.

Further, the following method has been proposed previously by the applicant:

(3) A method of winding a sheet-like film consisting of a thermoplastic resin and a sheet-like film consisting of a fluoroplastic on a columnar member in such a manner that the leading and trailing edges of the films overlap, fitting a tubular member over the two-layered film thus wound, subsequently heating the whole to bond the overlapping portions of the films and fuse the film layers, thereby obtaining a tubular film comprising the two layers, namely the fluoroplastic film layer and the base layer.

By making the coefficient of thermal expansion of the columnar member larger than that of the tubular member, the gap between them diminishes when heating is applied, the step or difference in level at the overlapping portions vanishes and a uniform film thickness is achieved over the entire circumference. In addition, controlling the gap makes it possible to control the overall film thickness at will.

However, the examples of the prior art mentioned above certain disadvantages. Specifically, in method (1) of applying a coating of the fluoroplastic particles, drying the coating and then calcining the same, it is required that a high temperature be maintained for a prescribed period of time when the fluoroplastic is calcined. For example, the temperature is on the order of 400° C. for PTFE (polytetrafluoroethylene) and 350° C. for PFA (a copolymer of tetrafluoroethylene and perfluoroalkyl vinyl ether). In a case where a resin is used as the base, it is required that this exhibit resistance to heat. Further, even if the resin is capable of withstanding the high temperatures cited above, the resin undergoes heat deterioration, deformation caused by relaxation of internal stress and surface roughness due to the formation of bubbles caused by water content.

Difficulties similar to those encountered in method (1) also arise with the method (2), in which use is made of the fluoroplastic tube covering.

Further, in a case where the fluoroplastic tube or fluoroplastic film sheet is used, as in methods (2) and (3) above, and a fluoroplastic layer having a thickness of less than 20 $\mu$m is formed, it is required that the tube or sheet have a corresponding thickness. However, manufacturing such a tube or sheet is difficult.

Many fluoroplastic tubes and sheets currently available on the market have a thickness of greater than 20 $\mu$m. Manufacturing tubes or sheets having a smaller thickness raises cost and results in an article of higher price.

SUMMARY OF THE INVENTION

Accordingly, an object of the present invention is to provide an improved cylindrically shaped article, a method of manufacturing the article and an apparatus for the same.

Another object of the present invention is to provide a fixing device and a conveyance unit using a tubular film in a case where the tubular film is employed as the cylindrically shaped article.

In the present invention, the term "tubular" used in the following description is meant to cover such shapes as a loop shape, tube shape, annular shape, ring shape, cylindrical shape, wheel shape and hollow shape formed by connecting a planar or sheet-like film at its opposing ends.

A first aspect of the invention resides in forming at low cost and high precision, a fluoroplastic layer on the surface of a fixing roller, fixing film, transfer roller and transfer belt for a fixing device and transfer device which perform fixing and transfer of an image by transporting an image carrier such as paper bearing the image in an image forming apparatus.

A second aspect of the invention resides in providing a highly productive method of manufacturing a cylindrically shaped article, especially a tubular film, coated with a low-cost, highly precise fluoroplastic layer.

A third aspect of the invention resides in obtaining a desired fluoroplastic layer by freely setting the surface shape (surface roughness) and film thickness of an applied fluoroplastic layer.

In the third aspect of the invention, there is provided a cylindrically shaped article, especially a tubular film, formed to have a fluoroplastic layer whose film thickness is less than 20 $\mu$m.

In the third aspect of the invention, there is provided a cylindrically shaped article, especially a tubular film, formed to have a fluoroplastic layer whose surface roughness Rz is less than 3 $\mu$m.

Furthermore, the present invention provides a fixing device using the cylindrically shaped article or tubular film mentioned above, the fixing device being free of the problem of offset that arises when the toner of an image forming apparatus is fixed. The invention further provides an image forming apparatus in which a high-definition image can be obtained by using this fixing device.

The present invention provides a method of manufacturing a cylindrically shaped article, especially a tubular film, obtained by forming a thermoplastic resin layer on at least one of an inner peripheral surface or outer peripheral surface, the method comprising coating the outer peripheral surface of a cylindrically shaped article supported on a columnar member with thermoplastic resin particles or solution in which thermoplastic resin particles are dispersed, drying and removing the solvent as necessary, fitting a tubular member over the columnar member and cylindrically shaped article, and then heating at least the columnar member to calcine the thermoplastic resin film on the outer peripheral surface of the cylindrically shaped article.

Further, the present invention provides a method of coating the inner peripheral surface of a cylindrically shaped article supported on a tubular member with thermoplastic resin particles or a solution in which thermoplastic resin particles are dispersed, drying and removing the solvent as necessary, inserting a columnar member into the interior of the tubular member and cylindrically shaped article, then heating at least the columnar member to calcine the thermoplastic resin film on the inner peripheral surface of the cylindrically shaped article.

In relation to the foregoing, the coefficient of thermal expansion of the columnar member is made larger than that of the tubular member.

Further, as for the method of applying the coating of the thermoplastic resin powder, the dispersion of the thermoplastic resin powder is applied by spray coating, dip coating or spin coating.

Further, in order to set the surface shape of the formed thermoplastic resin layer at will, the surface shape of the outer peripheral surface of the columnar member or the surface shape of the inner peripheral surface of the tubular member is transferred to the thermoplastic resin layer.

As a result, a thermoplastic resin layer can be formed on the inner peripheral surface or outer peripheral surface irrespective of the ability of the cylindrically shaped article to withstand heat.

Applying the coating of the thermoplastic resin particles make it possible to form a thermoplastic resin layer having a thickness of less than 20 $\mu$m, which could not be achieved using the conventional thermoplastic resin tube or sheet.

Further, transferring the surface shape of the outer peripheral surface of the columnar member or the surface shape of the inner peripheral surface of the tubular member to the thermoplastic resin layer makes it possible to freely design the surface shape of the thermoplastic resin layer, which could not be achieved with the conventional methods.

In particular, making the surface roughness Rz of the inner peripheral surface of the tubular member less than 3 $\mu$m and transferring this surface shape to the thermoplastic resin layer makes it possible to obtain a desired surface roughness for the thermoplastic resin layer in a case where it is used as the fixing member of an image forming apparatus.

As a result of the foregoing, the present invention provides a fixing device for an image forming apparatus in which a high image quality can be obtained, wherein a cylindrically shaped article obtained by forming a thermoplastic resin layer on an outer peripheral surface is used as a fixing roller or fixing film, and a toner on an image bearing member is pressurized between a pressure member and the fixing device, thereby fixing the toner.

Other features and advantages of the present invention besides those discussed above shall be apparent to those skilled in the art from the description of a preferred embodiment of the invention which follows. In the description, reference is made to accompanying drawings, which form a part thereof, and which illustrate an example of the invention. Such examples, however, are not exhaustive of the various embodiments of the invention, and therefore reference is made to the claims which follow the description for determining the scope of the invention.

BRIEF DESCRIPTION OF THE DRAWINGS

FIG. 1 is a diagram for describing a state in which a cylindrically shaped article has been placed upon a columnar member;

FIG. 2 is a diagram of a tubular member;

FIG. 15 is a diagram for describing a third embodiment of the present invention;

FIG. 16 is a diagram for describing a third embodiment of the present invention;

FIG. 17 is a diagram for describing a fourth embodiment of the present invention;

FIG. 18 is a diagram for describing a fourth embodiment of the present invention;

DESCRIPTION OF THE PREFERRED EMBODIMENTS

Figure 3:
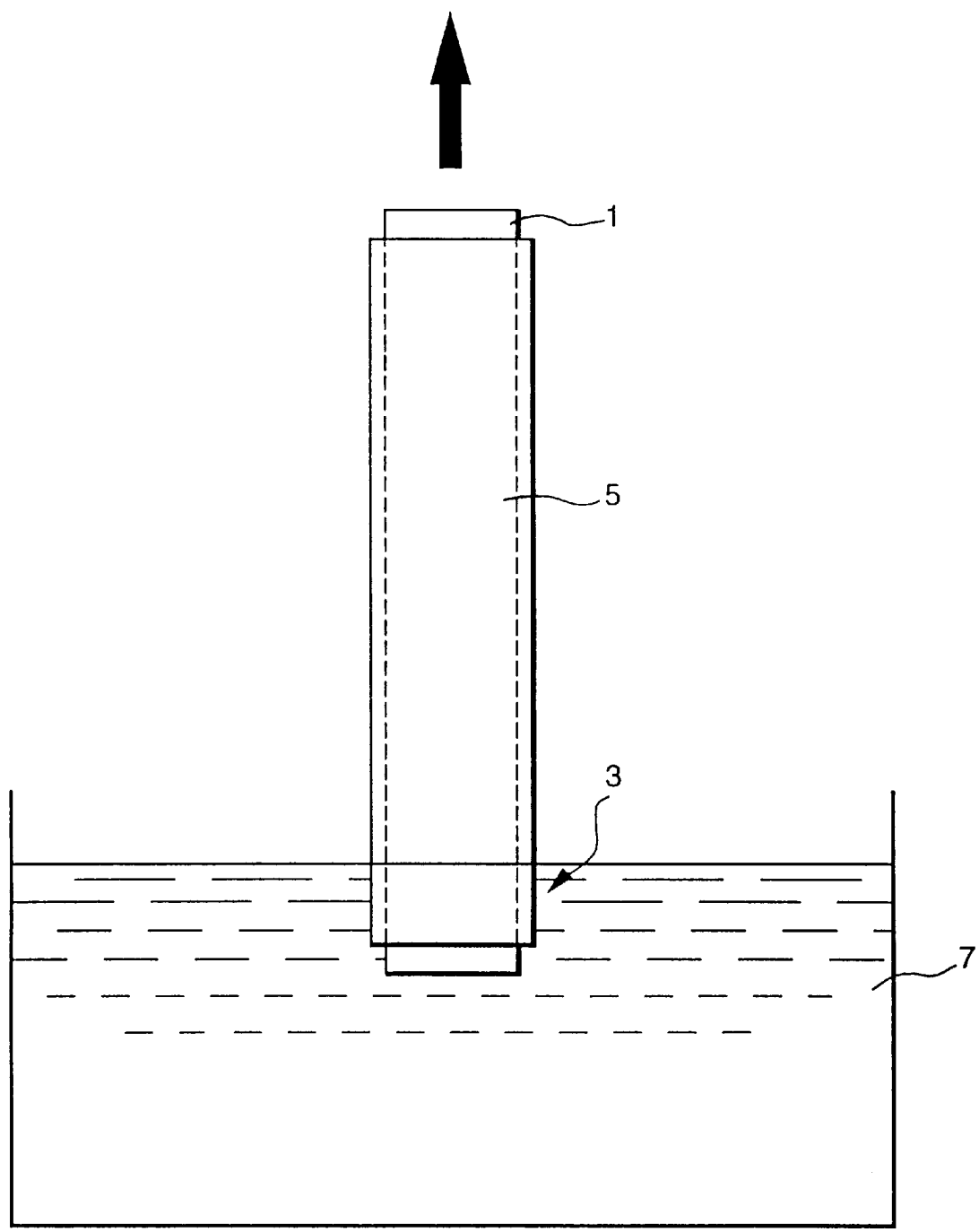
FIG. 3 is a diagram for describing a state in which a coating of fluoroplastic particles is applied by dip coating.

Preferred embodiments of the present invention will now be described in detail with reference to the accompanying drawings.

First Embodiment

FIGS. 1 through 8 are diagrams for describing a first embodiment of the invention.

This embodiment illustrates an example in which a tubular film made of resin and having a thickness of 50 $\mu$m is used as a cylindrically shaped article and the outer peripheral surface of the film is coated with a fluoroplastic layer.

Numeral 1 denotes a columnar member supporting a tubular film 3. In this example a solid rod is used as the columnar member 1. Numeral 2 denotes a tubular or hollow mold member the inner diameter of which is such that the columnar member 1 may be passed through it.

In this example aluminum, stainless steel and non-thermoplastic polyimide resin (abbreviated to "polyimide" below) are used as the columnar member 1, the tubular member 2 and the cylindrically shaped article 3, respectively.

This embodiment will now be described in greater detail.

The sizes of the columnar member 1 and tubular member 2 are selected in conformity with the inner diameter of the tubular film manufactured.

First, the tubular polyimide film 3 prepared has an inner diameter of 24.0 mm and a length of 300 mm. The polyimide film 3 has an outer peripheral surface 3a that has been coated with a fluoroplastic primer 4 to a thickness of 5 $\mu$m to improve the adhesion between the polyimide film 3 and a fluoroplastic layer 5, which will be the surface layer. Accordingly, the total thickness of the fluoroplastic film used is 55 $\mu$m. The fluoroplastic primer is a mixture of fluoroplastic, an organic binder resin and a solvent (I-butanol, diacetone alcohol, methyl isobutyl ketone, N-methyl pyrrolidone, etc.) and is applied by spray coating, dip coating, etc.

The coefficient of thermal expansion of the columnar member 1 is $2.4 \times 10^{-5}$ (/°C.) and that of the tubular member 2 is $1.2 \times 10^{-5}$ (/°C.).

The columnar member 1 has an outer diameter of 24.00 mm and a length of 330 mm, the tubular member 2 has an inner diameter of 24.26 mm, an outer diameter of 30.0 mm and a length of 330 mm. The dimensions of the columnar member 1 and tubular member 2 are so designed that the difference between the outer diameter of the columnar member 1 and the inner diameter of the tubular member 2 will take on a value of 130 $\mu$m when heating is applied at a temperature of 350° C. in a subsequent heating step.

First, as shown in FIG. 1, the outer peripheral surface 1a of the columnar member 1 was covered with the prepared tubular film 3 consisting of polyimide. It should be noted that before the columnar member 1 was covered with the polyimide tubular film 3, the surface of the tubular film 3 was coated with the fluoroplastic primer by a method such as dip coating or spray coating, as mentioned above.

Next, as shown in FIG. 3, the outer peripheral surface 3a of the tubular film 3 supported on the columnar member 1 was coated, by means of a dip coating device 7, with a dispersion of fluoroplastic particles (PFA) (the dispersion comprises 20~25 percent by weight of fluoroplastic particles and 75~80 percent by weight of a surface-active agent). This was followed by drying for 30 min at a temperature of 150° C. The thickness of the fluoroplastic layer 5 thus formed was 10 $\mu$m. It should be noted that the dispersion of fluoroplastic particles was a solution in which the solids content concentration of ingredients identical with those of the above-mentioned fluoroplastic primer was 16~25 percent by weight, and that this was applied as the coating at room temperature.

Figure 4:
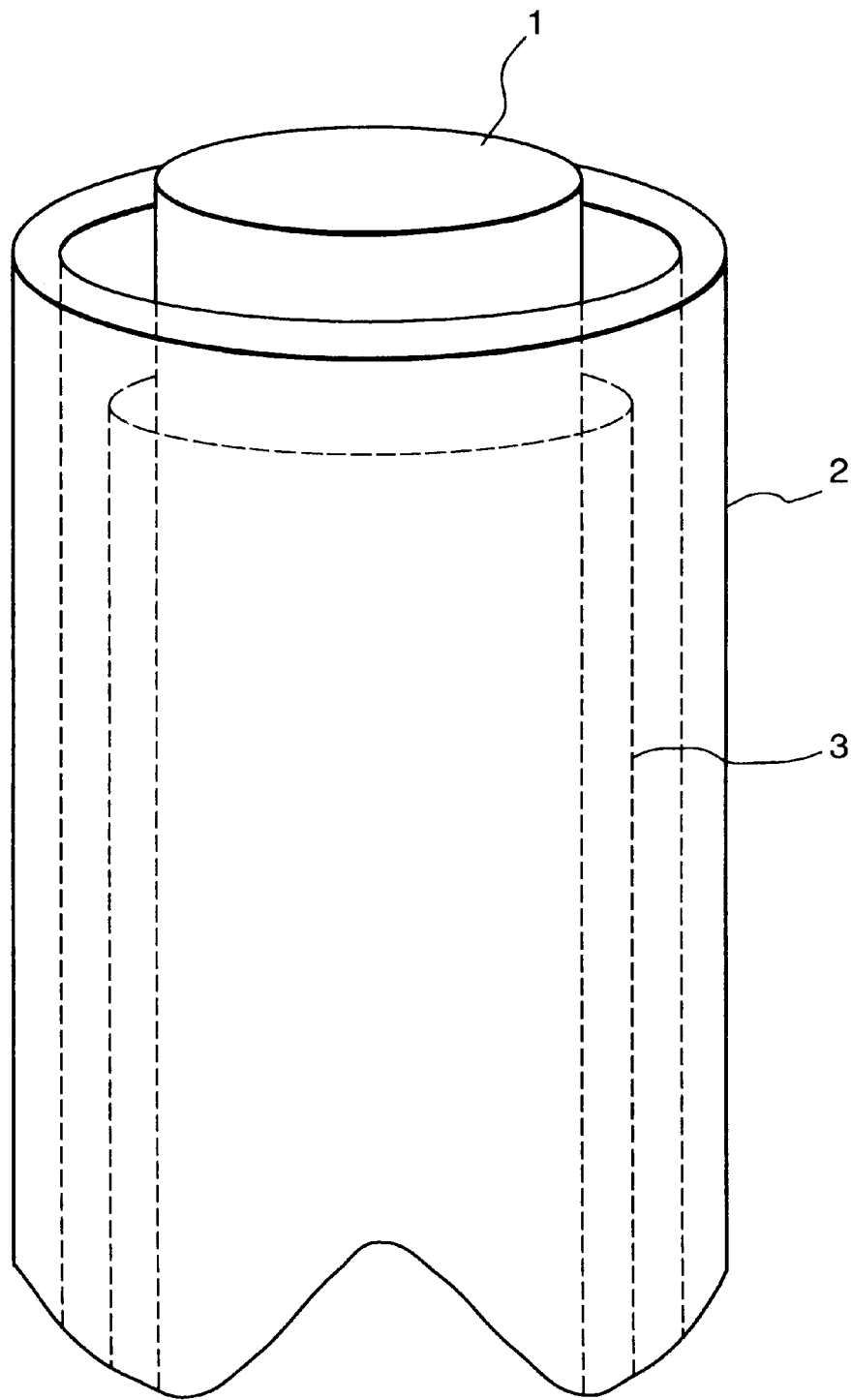
FIG. 4 is a diagram for describing a state in which a cylindrically shaped article has been placed upon a columnar member and the tubular member has been placed upon the cylindrically shaped article.

Furthermore, the tubular film 3 on which the fluoroplastic layer 5 was formed and the columnar member 1 were passed through the hollow interior of the tubular member 2 as a whole, as illustrated in FIG. 4.

Figure 5:
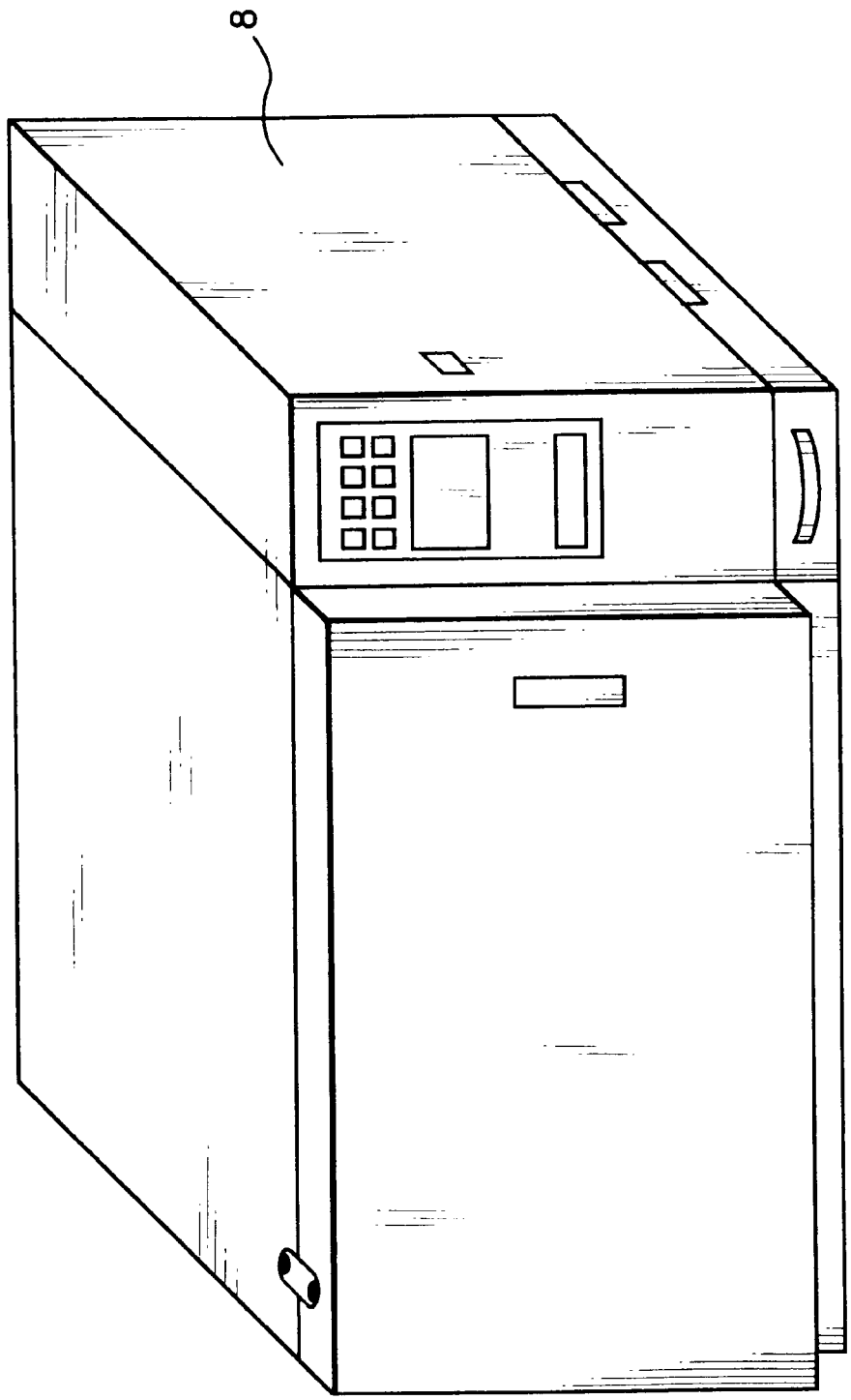
FIG. 5 is a diagram for describing a heating oven used in a heating step.

Next, the columnar member 1, the tubular film 3 and the tubular member 2 were placed in a heating oven 8, which is shown in FIG. 5, whereby heating was applied. The detailed structure of the heating oven 8 is illustrated in FIG. 6.

Figure 6:
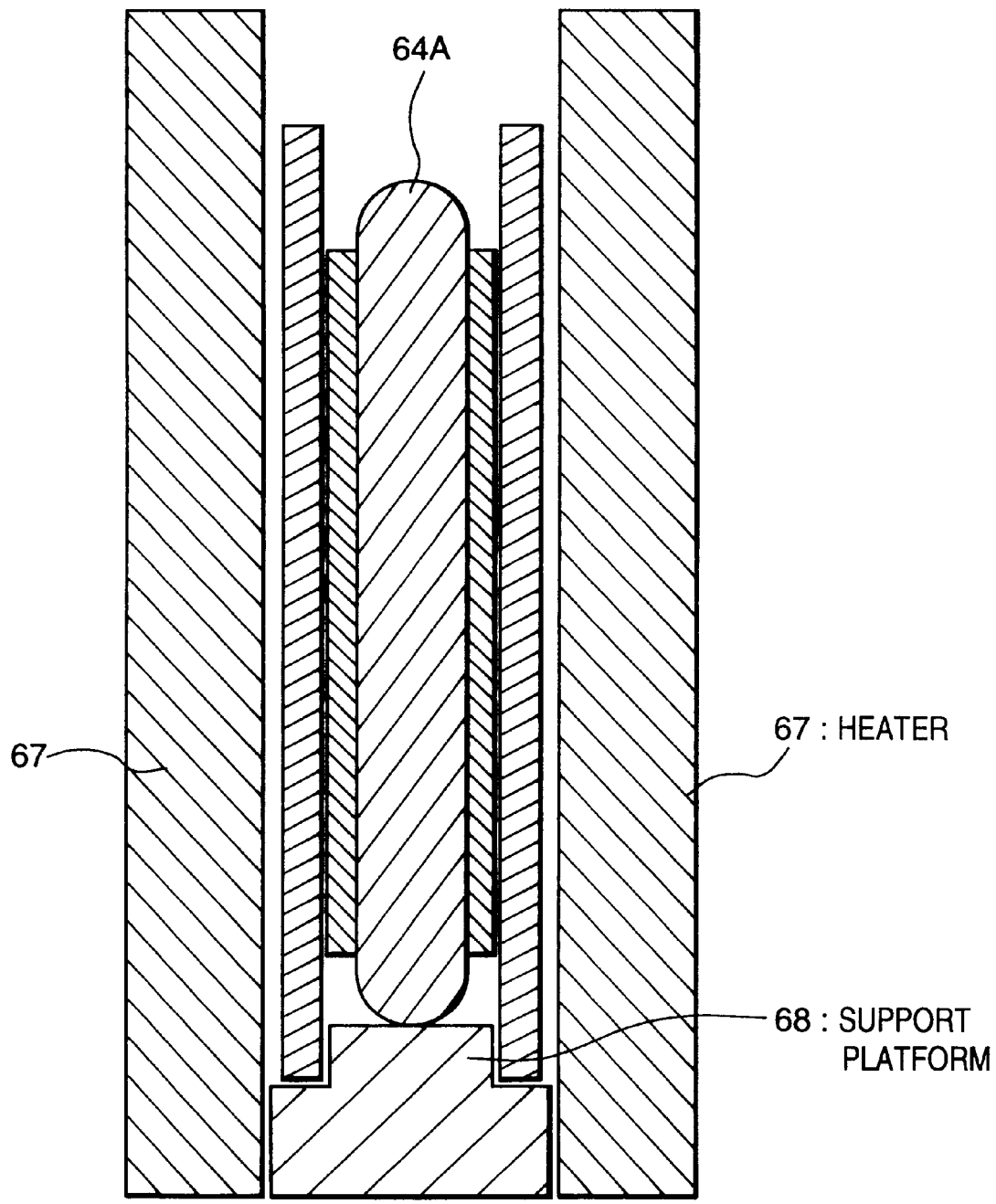
FIG. 6 is a diagram for describing a heating state in detail.

As shown in FIG. 6, a support platform 68 was secured to the base (not shown) of the heating oven, a heater 67 was placed upon the support platform 68 and a spacer 64a was formed on the inner side of the heater 67 in order to dispose the columnar member, the film and the tubular member. The temperature of the heater 67 was controlled by temperature control means, not shown.

The heating conditions within the heating oven 8 were a heating temperature of 350±5° C. and a heating time of 30±1 min.

The columnar member 1, tubular film 3 and tubular member 2 each rose in temperature within the heating oven 8. The columnar member 1 and tubular member 2 begin expanding in dependence upon their coefficients of thermal expansion. Since the coefficient of thermal expansion of the aluminum constituting the columnar member 1 is greater than that of the stainless steel constituting the tubular member 2, the gap defined between the outer and inner diameters of the columnar member 1 and tubular member 2 narrowed sharply owing to the initial state of low temperature. With the narrowing of the clearance between the columnar member 1 and the tubular member 2, the fluoroplastic (PFA) layer 5 constituting the surface layer fused and was calcined to form a film.

The gap between the columnar member 1 and tubular member 2 eventually became the desired film thickness (65 $\mu$m). The film thickness conformed to the gap and was rendered uniform over its entire circumference.

Figure 7:
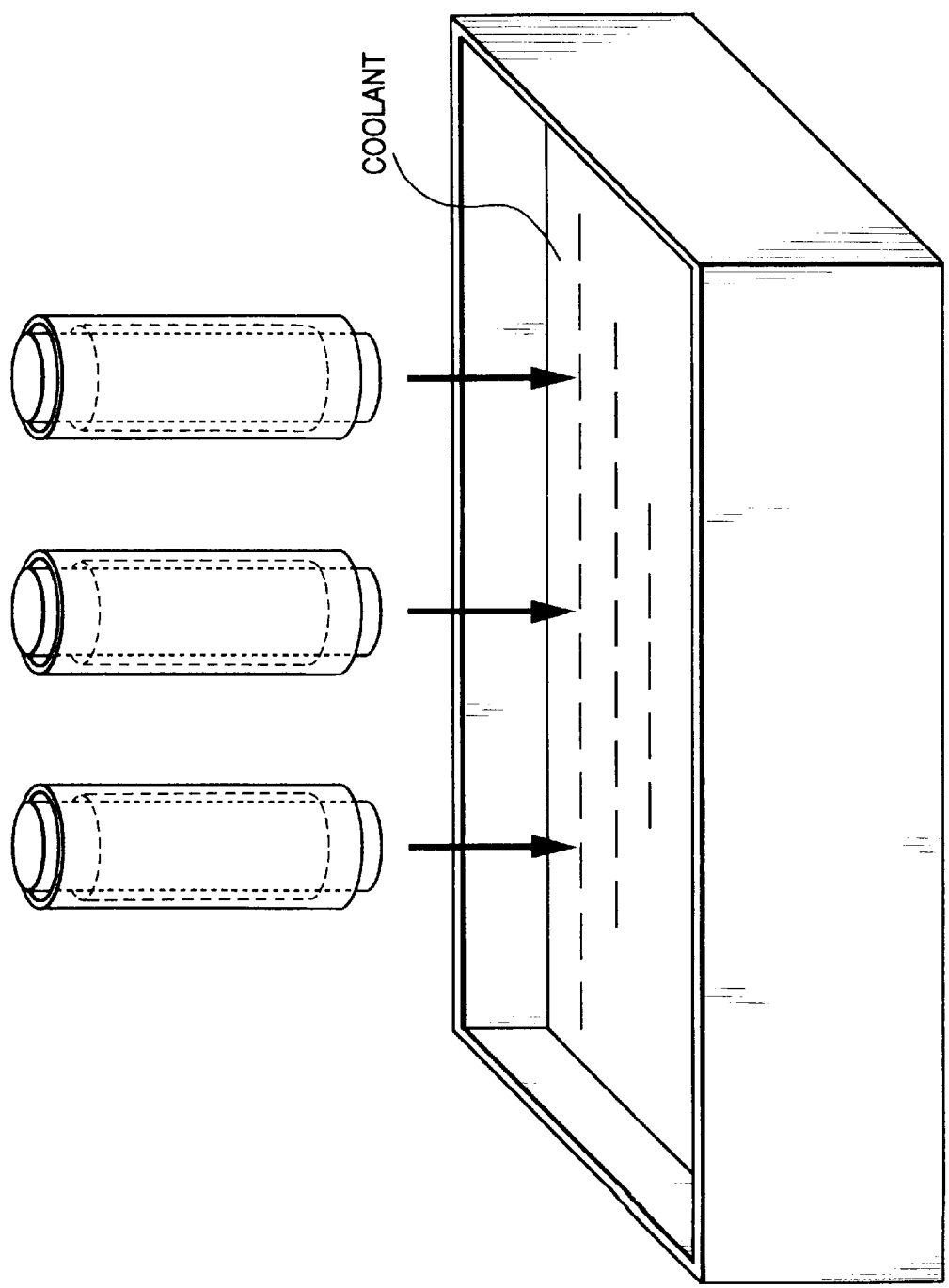
FIG. 7 is a diagram for describing a cooling state.

Upon elapse of the heating time of 30 min. mentioned above, heating was halted and a transition was made to a cooling process (FIG. 7).

The cooling of the columnar member 1, film 3 and tubular member 2 at the cooling step may be performed by allowing cooling to take place naturally after the termination of heating. To shorten cooling time, however, rapid cooling may be carried out. In this example, the columnar member 1, film 3 and tubular member 2 were immersed in a bath of cooling water after being heated, with cooling being performed at a cooling speed of 300° C./min.

Cooling was continued until room temperature was reached, after which the tubular film 3 was extracted from between the columnar member 1 and tubular member 2. The result was a tubular film having the fluoroplastic layer 5 formed as its surface layer.

The state in which the tubular film 3 manufactured by the above method is used will now be described.

Figure 8:
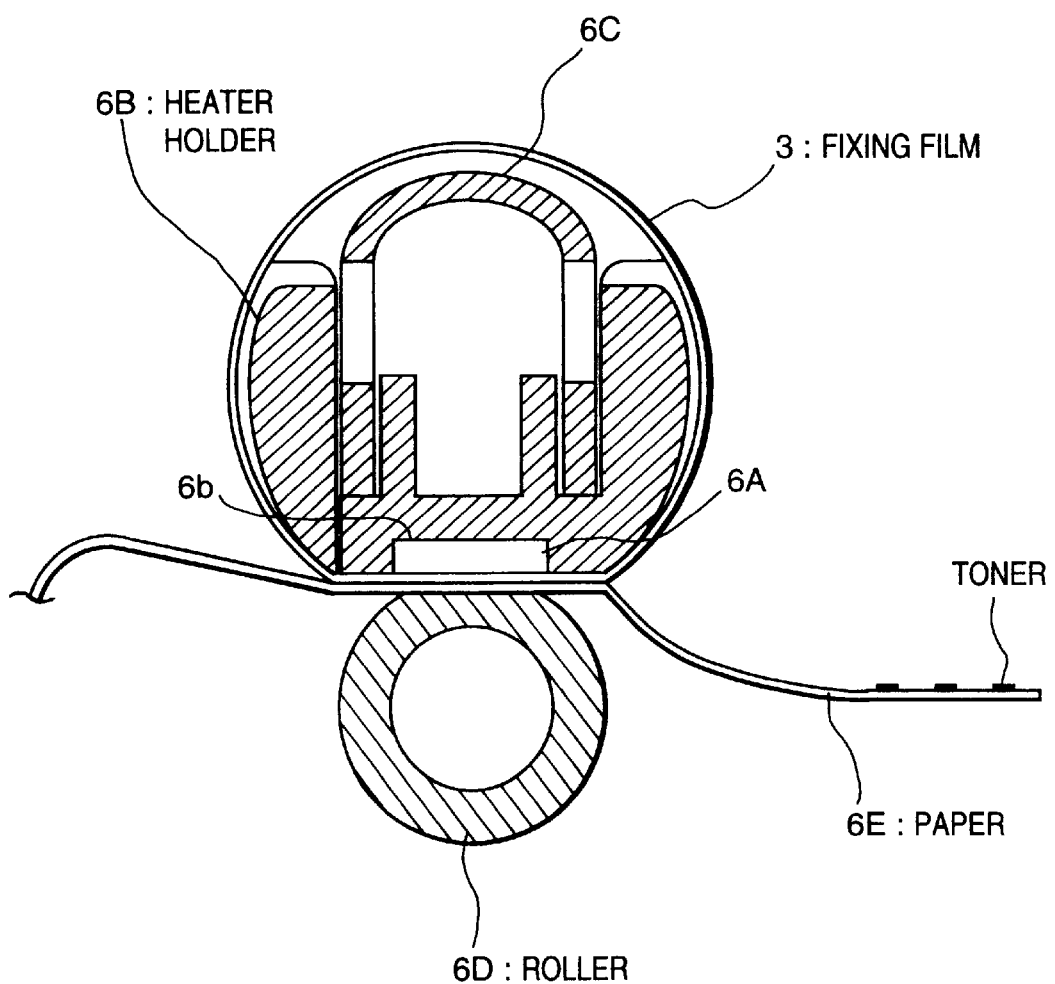
FIG. 8 is a diagram for describing the fixing device of an image forming apparatus using a film according to the present invention.

An example will be illustrated in which the tubular film obtained by this embodiment is used as a fixing film 3 of a fixing device employed in an image forming apparatus (LBP, or laser beam printer) illustrated in FIG. 8.

In FIG. 8, numeral 3 denotes the tubular film (fixing film) according to the present invention. A heater 6A for heating the fixing film 3 is held by a heater holder 6B. A stay 6C is formed to have a generally U-shaped cross section. These components are so arranged that the fixing film 3 fits into the outer peripheral surface of the stay 6 and heater holder 6B. A pressure roller 6D is driven by drive means, not shown.

As shown in FIG. 8, a carrier 6E such as a sheet of paper bearing toner that forms an image is transported while being passed between the fixing film 3 and the pressure roller 6D. The heat of the fixing film received from the heater is transmitted to the toner and the toner is fixed to the paper by the application of pressure and heat. By virtue of the fact that the fixing film according to the invention has a film thickness exhibiting a very high degree of uniformity and the fluoroplastic layer 5 which is evenly formed, there is no non-uniform transmission of heat from the film to the toner, the toner offset phenomenon does not occur and a very high image quality can be obtained.

The reasons why there is no non-uniform transmission of heat from the fixing film of this embodiment to the toner and no toner offset phenomenon will now be set forth.

As mentioned above in the description of the prior art, a method such as spray coating or dip coating is the conventional method used to form a fluoroplastic film. As the result of using these methods, the surface of the resin film becomes a free surface and, hence, there is a limit upon the degree to which the surface roughness of the fluoroplastic film surface can be controlled. In actuality, surface roughness Ra (where Ra is the center-line mean roughness) of the fluoroplastic film formed by these methods is 2~3 $\mu$m.

The problem which arises when a fixing film having this surface roughness is used will be described.

In the image forming apparatus of the kind shown in FIG. 8, when unfixed toner on the paper 6E enters the fixing section, the toner is fixed under application of pressure and heat, where the pressure is produced between the fixing film and the pressure roller 6D and the heat is provided by the heater.

Figure 25:
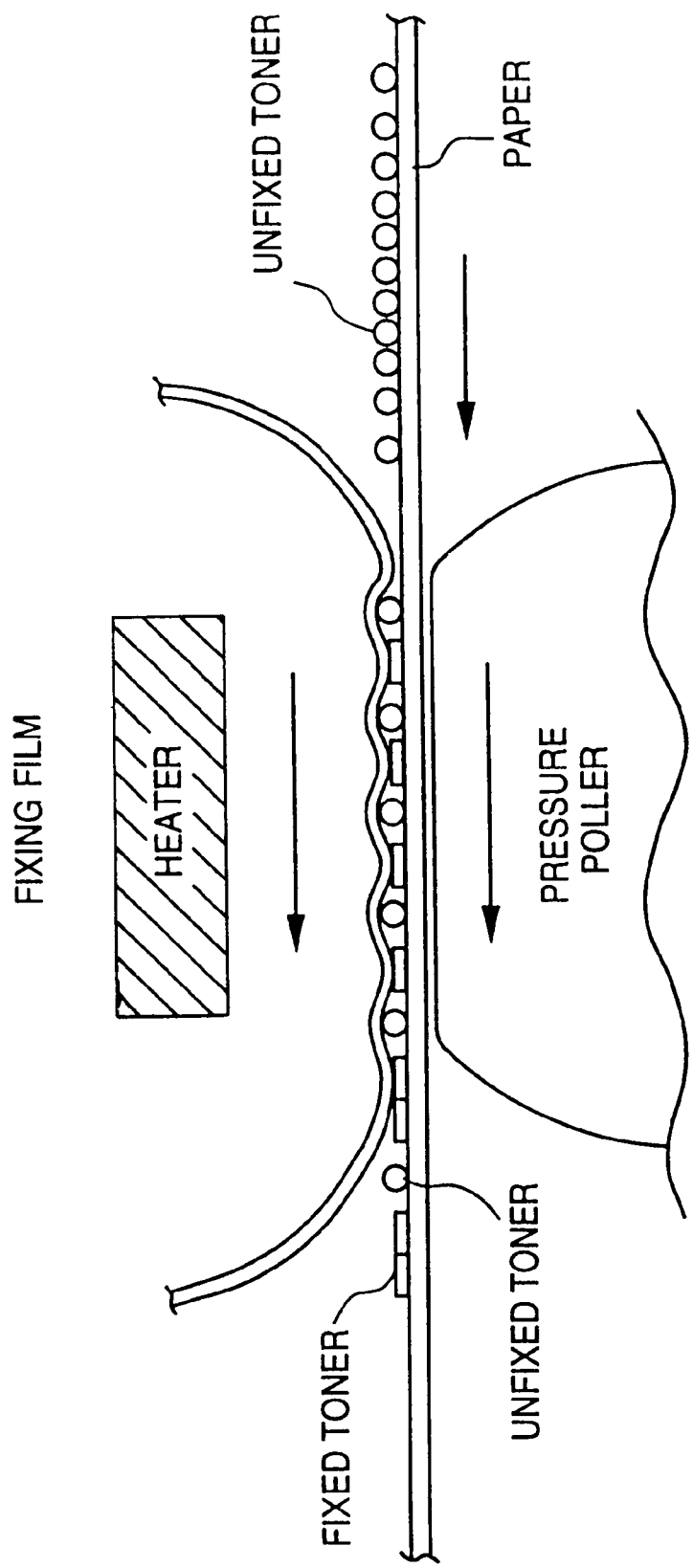
FIG. 25 is a diagram illustrating the fixing of toner when the surface of a fixing film is rough.
Figure 26:
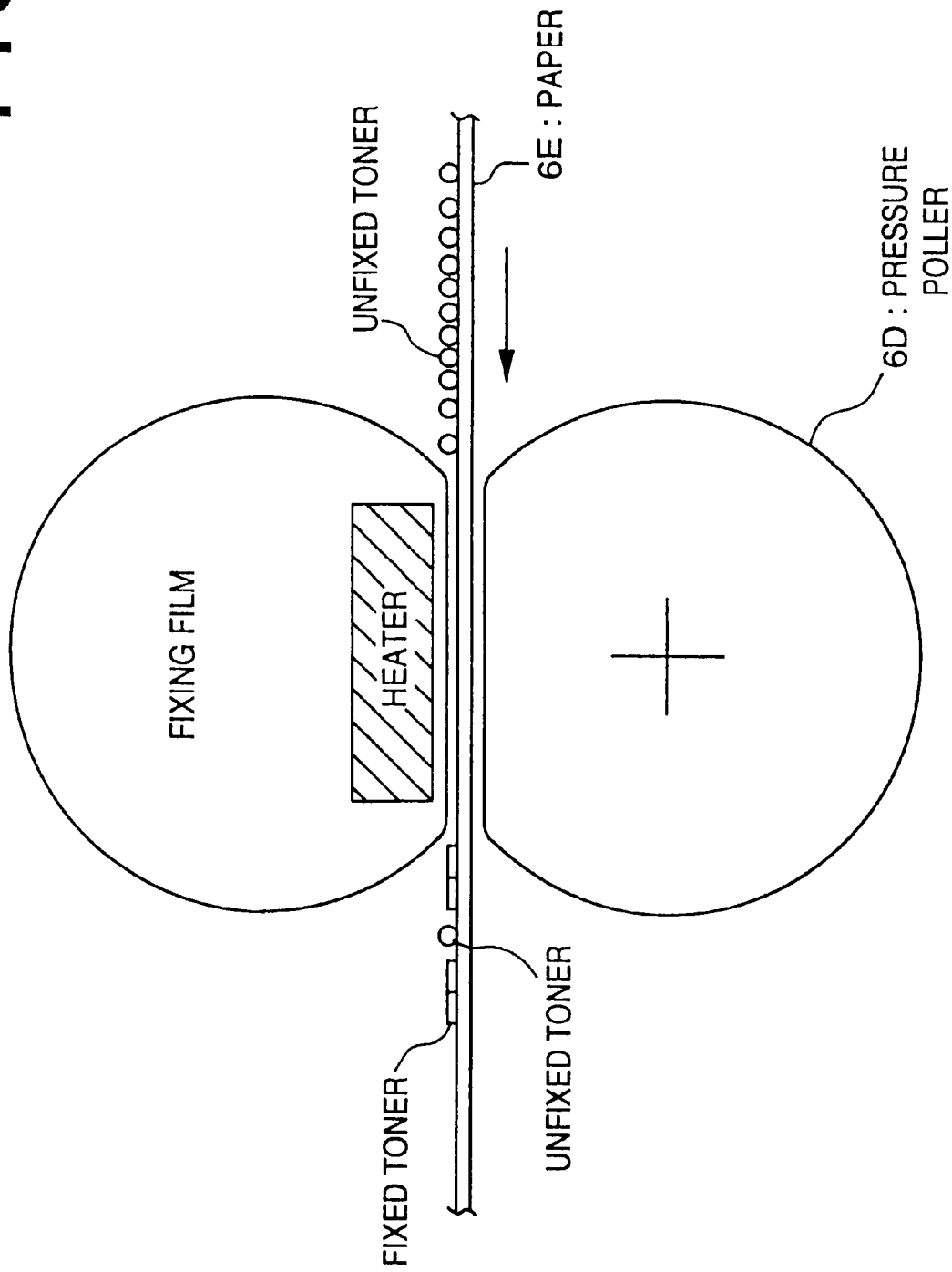
FIG. 26 is a diagram illustrating the fixing of toner when the surface of a fixing film is rough.

For example, in a case where the fixing film has a rough surface and unfixed toner has penetrated the depressions in the film surface in the manner shown in FIGS. 25 and 26, the toner is not subjected to enough pressure between the fixing film and the pressure roller. In addition, owing to the rough surface, a large number of air layers are produced between the fixing film and the paper and the heat from the heater is not readily transmitted because of the insulating effect of the air layers. The result of this synergism is that the paper that has passed through the fixing section has both fixed and unfixed toner.

When unfixed toner remains on the paper that has passed through the fixing section, a phenomenon (a blurring phenomenon) occurs in which the image printed on the paper appears to have shifted slightly. Conversely, when unfixed toner remains on the side of the fixing film, a phenomenon (the offset phenomenon) occurs. This is a phenomenon in which the unfixed toner becomes fixed on recording paper passed through the fixing section subsequently.

The cause of these problems is largely the surface roughness of the fixing film. Accordingly, there is need of a fixing film having a smoother surface.

In contrast to the foregoing, the surface of the fluoroplastic film formed by the technique of this embodiment has its shape controlled by shape transfer, as a result of which it is possible to form a very dense and smooth film. As a result, the surface roughness Ra of the film according to this embodiment is 0.4~0.5 $\mu$m. Accordingly, non-uniform transfer of heat to the toner does not readily occur and neither does the toner offset phenomenon.

It should be noted that the cylindrically shaped article 3 capable of being used in the present invention may consist of any material so long as it is an elastic body. A resin material is particularly well suited.

Second Embodiment

FIGS. 9 through 12 are diagrams for describing a second embodiment of the invention.

This embodiment illustrates an example in which use is made of a resin, having comparatively little resistance to heat, which, owing to this low resistance to heat, is said to be unsuitable for formation of a fluoroplastic layer that requires to be calcined at high temperature after its application as a coating.

Figure 9:
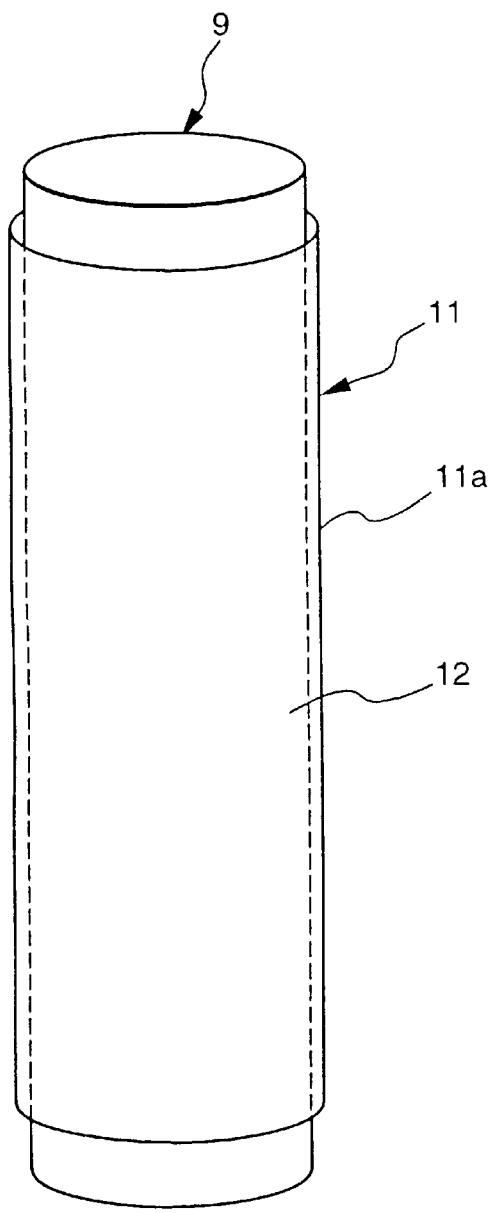
FIG. 9 is a diagram for describing a second embodiment of the present invention.
Figure 10:
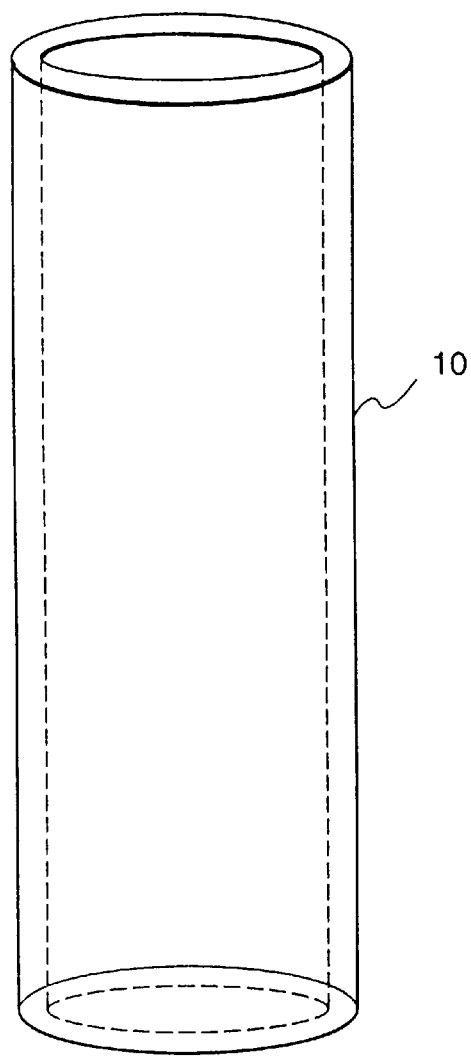
FIG. 10 is a diagram for describing a second embodiment of the present invention.

In FIGS. 9 and 10, numerals 9 and 10 denote a columnar member made of aluminum and a tubular member made of stainless steel, respectively. Both of these have coefficients of thermal expansion similar to those of the first embodiment. The outer and inner diameters of the columnar member 9 and tubular member 10, respectively, are designed in such a manner that the gap between these members will become 130 $\mu$m when they are heated to a temperature of 290° C.

Numeral 11 denotes a cylindrically shaped article (a resin tubular film) supported on the columnar member 9. The film consists of PES (polyether sulfone) and has a thickness of 50 $\mu$m. As in the first embodiment, the outer peripheral surface 11a of the film has been coated with a fluoroplastic primer 12 to a thickness of 5 $\mu$m so that the total thickness is 55 $\mu$m.

Figure 11:
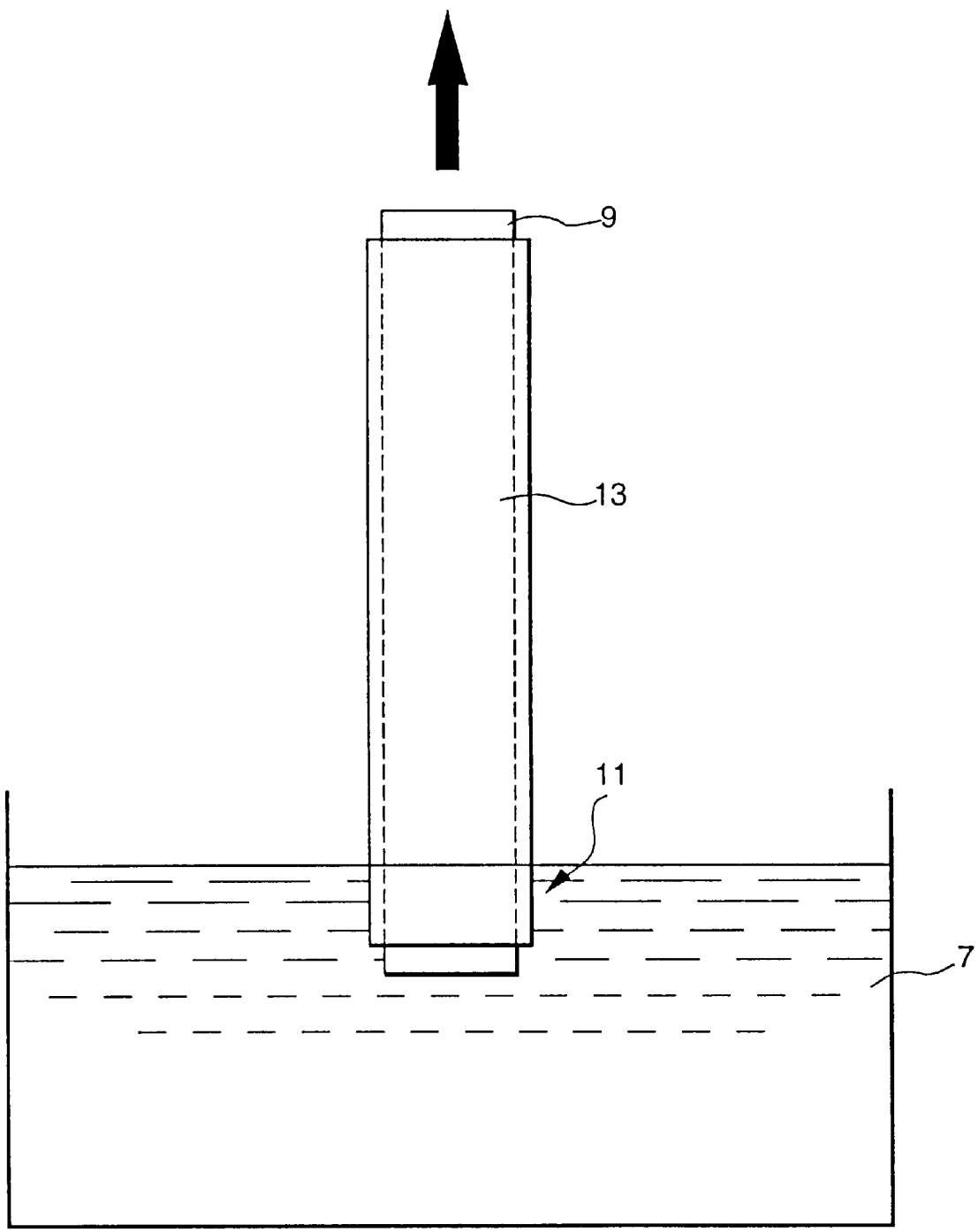
FIG. 11 is a diagram for describing a second embodiment of the present invention.

First, as shown in FIG. 9, the columnar member 9 was covered with tubular film 11 made of PES. Next, as shown in FIG. 11, the tubular film 11 was coated, by means of the dip coating device 7, with a dispersion of fluoroplastic particles (FEP). This was followed by drying for 30 min. at a temperature of 150° C. The thickness of the fluoroplastic layer 13 thus formed was 10 $\mu$m.

Figure 12:
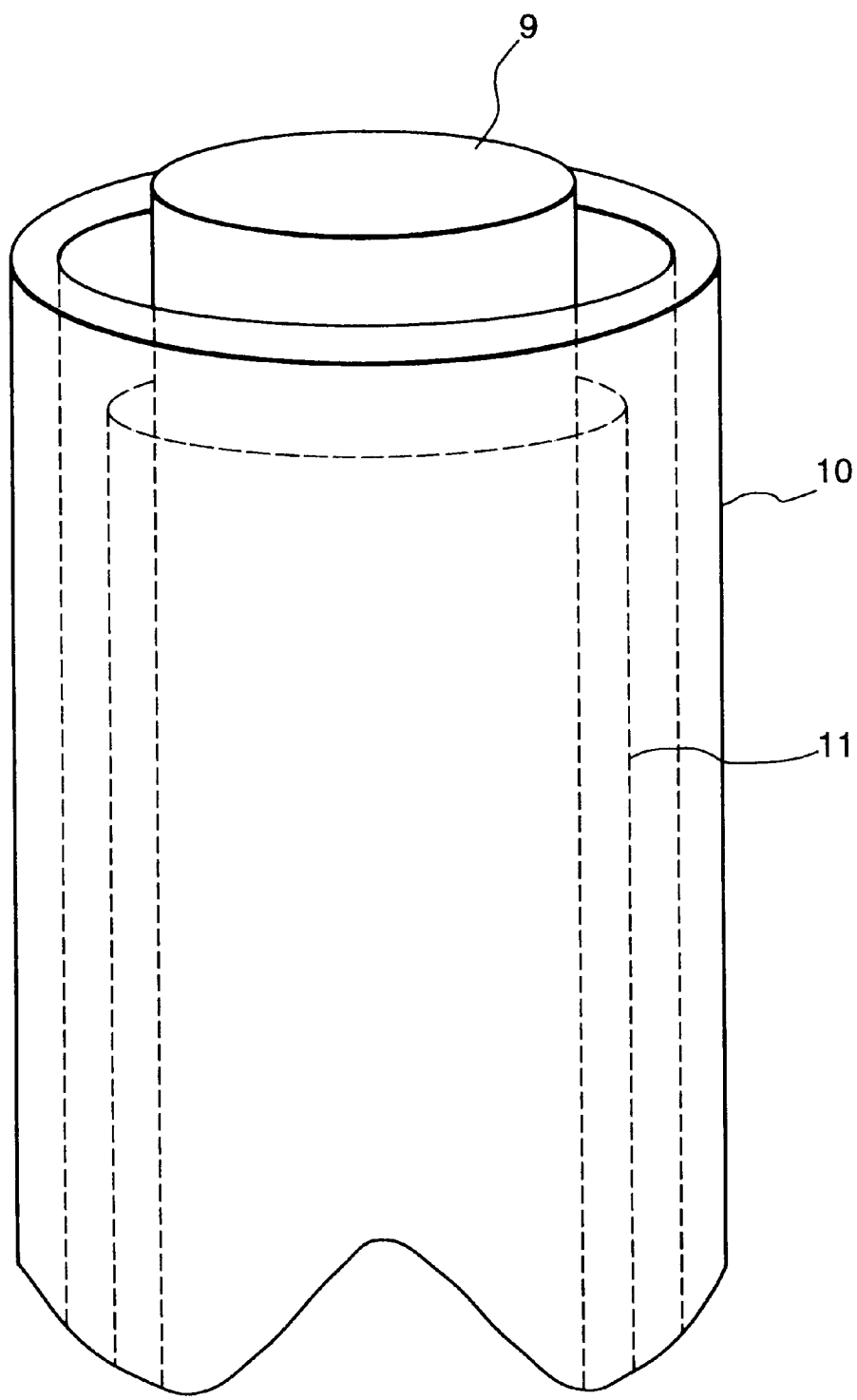
FIG. 12 is a diagram for describing a second embodiment of the present invention.

Furthermore, the tubular film 11 on which the fluoroplastic layer 13 was formed and the columnar member 9 supporting the tubular film 11 were passed through the hollow interior of the tubular member 10 as a whole, as illustrated in FIG. 12.

Next, the columnar member 9, the tubular film 11 and the tubular member 10 were placed in the heating oven 8 and heated at 290° C. for 30 min.

The columnar member 9 and tubular member 10 were both heated in the heating process and underwent different degrees of dimensional expansion owing to the difference in coefficients of thermal expansion between the two members. As a result, the gap between the members narrowed to produce a uniform film thickness. In addition, the fluoroplastic layer 13 was calcined to form a film.

The tubular film 11 was extracted from between the columnar member 9 and tubular member 10 after cooling by a technique similar to that of the first embodiment. The result was a tubular film, the base of which consisted of PES, having an overall film thickness of 65 $\mu$m. The surface layer was fluoroplastic layer (FEP) having a thickness of 10 $\mu$m.

Example for Purposes of Comparison

Figure 13:
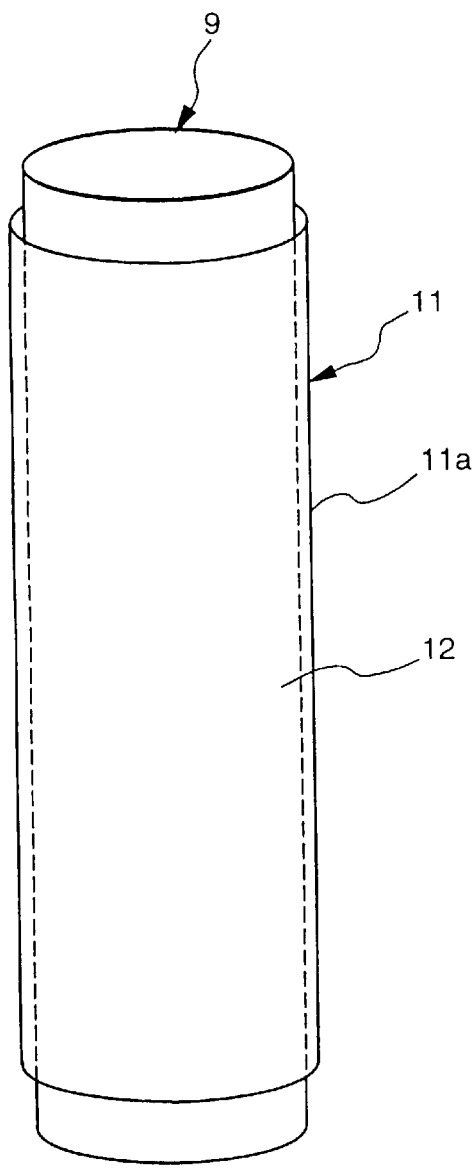
FIG. 13 is a diagram for describing an example used for making a comparison with the present invention.

FIG. 13 illustrates an example for the purpose of making a comparison with the second embodiment.

The columnar member 9 and cylindrically shaped article (the tubular film of PES) 11 were the same as those of the second embodiment in terms of the materials used, shape and arrangement. Further, the outer peripheral surface of the tubular film 11 was coated with the fluoroplastic primer 12 to a thickness of 5 $\mu$m so that the total thickness was made 55 $\mu$m.

First, as shown in FIG. 13, the columnar member 9 was covered with tubular film 11 made of PES. Then, as described above, the tubular film 11 was coated, by means of the dip coating device 7, with a dispersion of fluoroplastic particles (FEP). This was followed by drying for 30 min. at a temperature of 150° C. The thickness of the fluoroplastic layer 13 thus formed was 10 $\mu$m.

Next, unlike the process of the second embodiment, the tubular film 11 on which the fluoroplastic layer 13 was formed and the columnar member 9 supporting the tubular film 11 were placed in the heating oven 8 as is and they were heated at 290° C. for 30 min.

The tubular film 11 was taken off the columnar member 9 after cooling by a technique similar to that of the first embodiment.

Owing to the temperature of the heating step, the PES tubular film 11 serving as the base developed a rough surface brought about by fluidization of the resin and the bubbling of the water content. The result was that a uniform fluoroplastic layer 13 and uniform tubular film 11 were not obtained.

The reason for this is that the original shape cannot be maintained because the glass transition point (Tg) of PES is 223° C., which is lower than the temperature in the oven.

Third Embodiment

Figure 14:
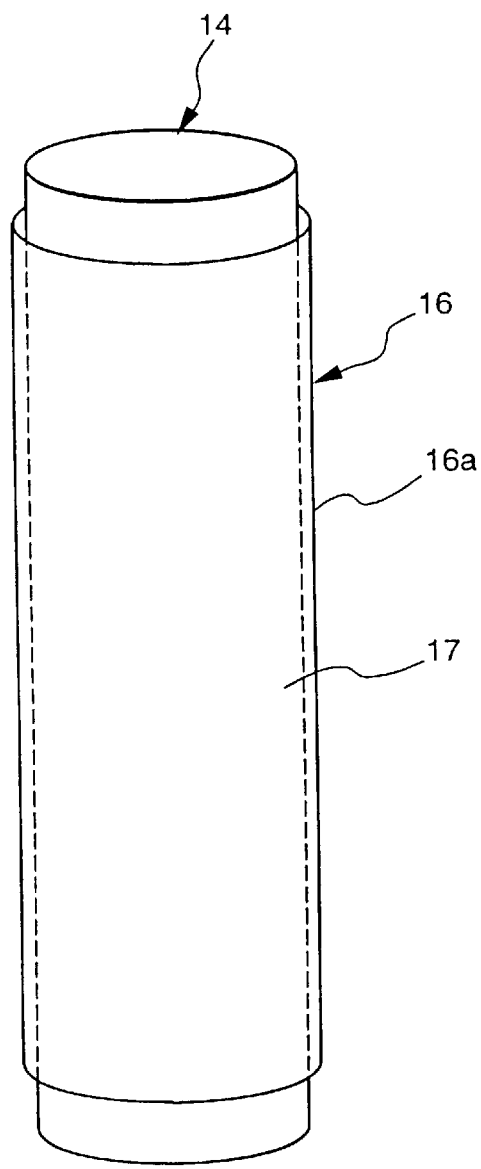
FIG. 14 is a diagram for describing a third embodiment of the present invention.

FIGS. 14 through 16 are diagrams illustrating a third embodiment of the invention.

This embodiment illustrates an example in which, when a tubular film obtained in accordance with the embodiment is used as a fixing film for an image forming apparatus, the surface roughness of the fluoroplastic layer is reduced further so as to obtain higher image quality.

In FIGS. 14 and 15, numerals 14 and 15 denote a columnar member made of aluminum and a tubular member made of stainless steel, respectively. Both of these have coefficients of thermal expansion similar to those of the first embodiment. The outer and inner diameters of the columnar member 14 and tubular member 15, respectively, are designed in such a manner that the gap between these members will become 130 µm when they are heated to a temperature of 290° C.

The tubular member 15 has an inner surface 15b worked to have an Rz (cross-point mean roughness) of 2.5 µm.

Numeral 16 denotes a cylindrically shaped article (a resin tubular film) supported on the columnar member 14. The film consists of PEEK (polyether ether ketone) and has a thickness of 50 µm. As in the first embodiment, the outer peripheral surface 16a of the film has been coated with a fluoroplastic primer 17 to a thickness of 5 µm so that the total thickness is 55 µm.

First, as shown in FIG. 14, the columnar member 14 was covered with the tubular film 16 made of PEEK. Next, in a manner similar to that described above, the tubular film 16 was coated, by means of the dip coating device 7, with a dispersion of fluoroplastic particles (FEP). This was followed by drying for 30 min. at a temperature of 150° C. The thickness of the fluoroplastic layer 13 thus formed was 10 µm.

Furthermore, the tubular film 16 on which the fluoroplastic layer 18 was formed and the columnar member 14 supporting the tubular film 16 were passed through the hollow interior of the tubular member 15 as a whole, as illustrated in FIG. 14.

Next, the columnar member 14, the tubular film 16 and the tubular member 15 were placed in the heating oven 8 and heated at 290° C. for 30 min.

The columnar member 14 and tubular member 15 were both heated in the heating process and underwent different degrees of dimensional expansion owing to the difference in coefficients of thermal expansion between the two members. As a result, the gap between the members narrowed to produce a uniform film thickness. In addition, the fluoroplastic layer 18 was calcined to form a film.

At the time of calcination the fluoroplastic layer 18 was acted upon pressure from the inner peripheral surface 15b of the tubular member 15 so that the surface shape of the surface 15b was transferred to the fluoroplastic layer 18.

The film 16 was extracted from between the columnar member 14 and tubular member 15 after cooling by a technique similar to that of the first embodiment. The result was a tubular film having an overall film thickness of 65 µm. The surface layer was fluoroplastic layer (FEP) having a thickness of 10 µm. The cross-point mean roughness Rz of the fluoroplastic surface layer 18 was measured and was found to be 2.8 µm. When the tubular film 16 was used as the fixing film 3 (FIG. 8) for the image forming apparatus, a very fine, very high-quality image was obtained.

Fourth Embodiment

FIGS. 17 through 20 are diagrams illustrating a fourth embodiment of the invention.

This embodiment illustrates an example in which a loop-shaped article, which obtained merely by overlapping the opposing edges of a thermoplastic resin sheet, is used as a cylindrically shaped article, the portion where the edges are overlapped is made seamless and, at the same time, a fluoroplastic layer is formed as a surface layer.

In FIGS. 17 and 18, numerals 19 and 20 denote a columnar member made of aluminum and a tubular member made of stainless steel, respectively. Both of these have coefficients of thermal expansion similar to those of the first embodiment. The outer and inner diameters of the columnar member 19 and tubular member 20, respectively, are designed in such a manner that the gap between these members will become 150 µm when they are heated to a temperature of 370° C.

Figure 19:
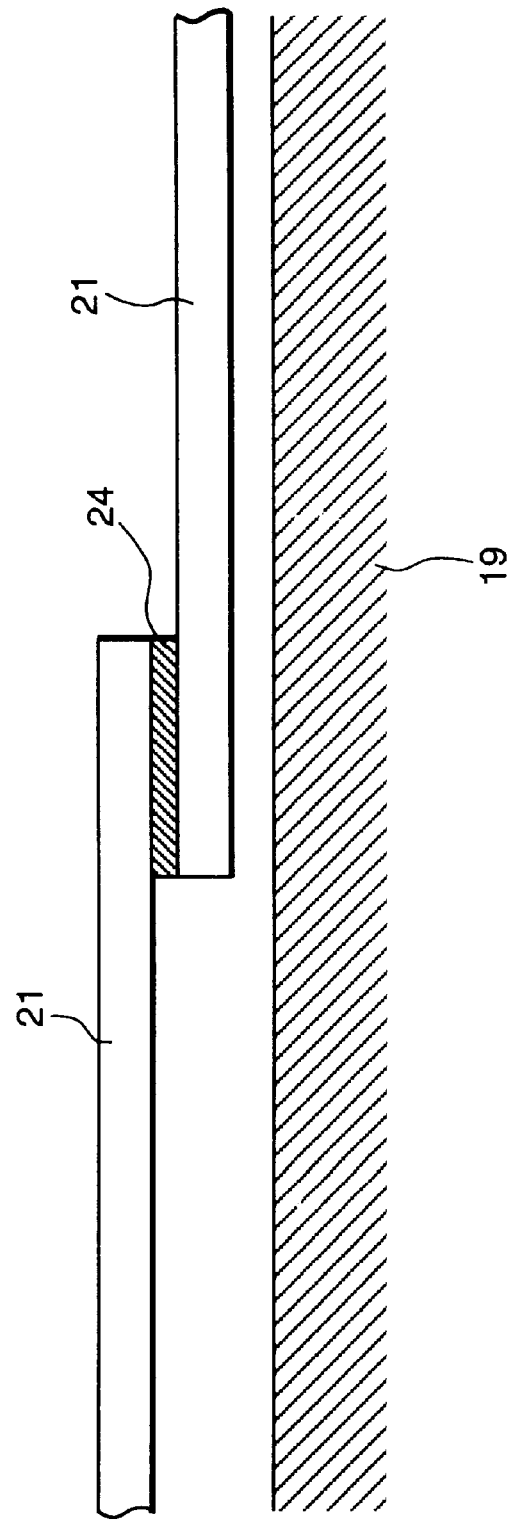
FIG. 19 is a diagram for describing a fourth embodiment of the present invention.

Numeral 21 denotes a looped resin film supported on the columnar member 19. The looped resin film 19 is obtained by overlapping the opposing edges of a PEEK (polyether ether ketone) sheet, which has a thickness of 50 µm, and bonding the overlapping edges together (see A in FIG. 17) by a bonding agent 24. FIG. 19 is a sectional view showing the overlapping portion A depicted in FIG. 17.

As in the first embodiment, the outer peripheral surface 21a of the film has been coated with a fluoroplastic primer 22 to a thickness of 5 µm so that the total thickness is 55 µm.

First, as shown in FIG. 17, the columnar member 19 was covered with the looped film 21 made of PEEK. Next, the film 21 was spray-coated with a dispersion of fluoroplastic particles (PFA). This was followed by drying for 30 min. at a temperature of 150° C. The thickness of the fluoroplastic layer 23 thus formed was 20 µm.

Figure 20:
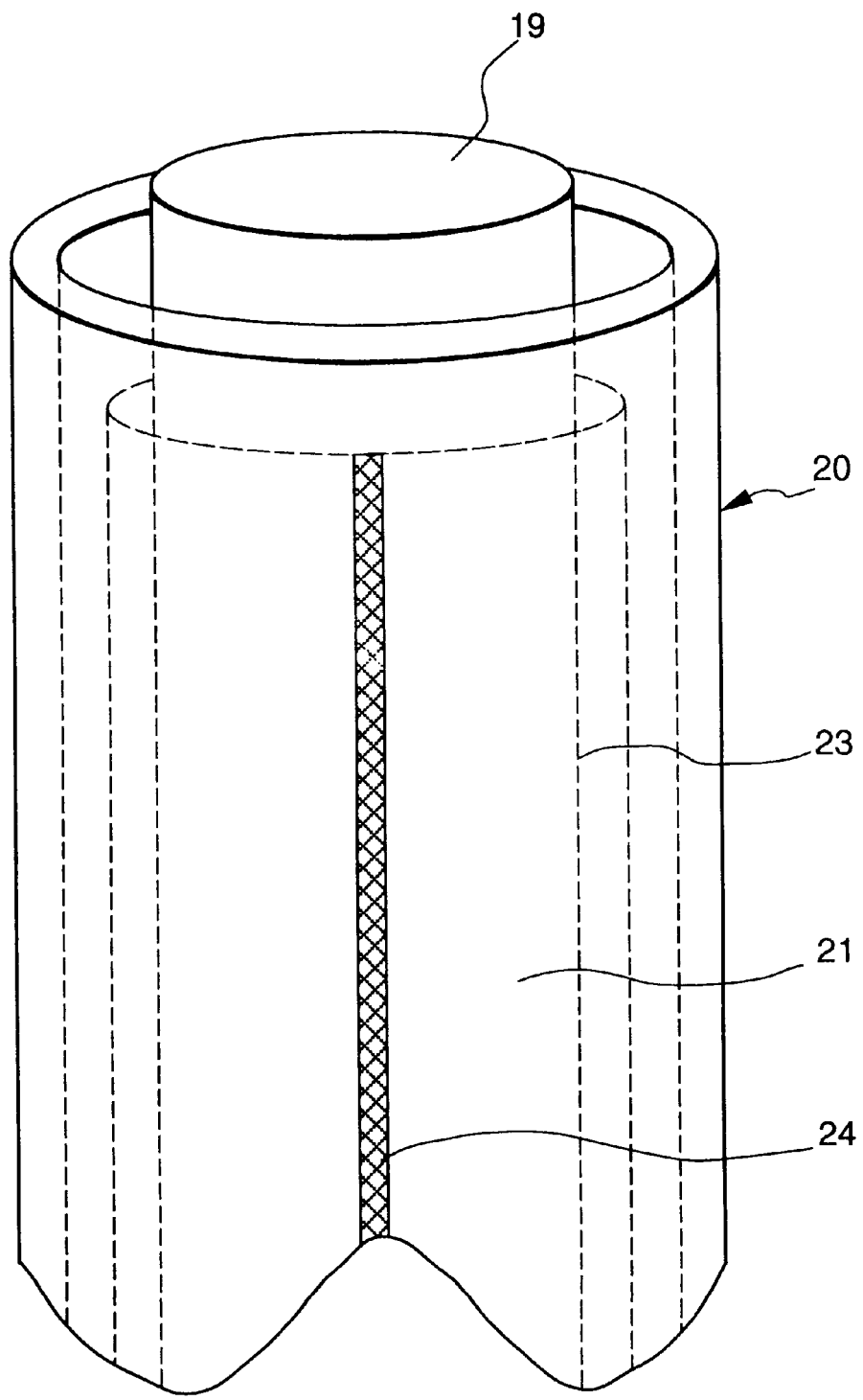
FIG. 20 is a diagram for describing a fourth embodiment of the present invention.

Furthermore, the film 21 on which the fluoroplastic layer 23 was formed and the columnar member 19 supporting the film were passed through the hollow interior of the tubular member 20 as a whole, as illustrated in FIG. 20.

Next, the columnar member 19, the film 21 and the tubular member 20 were placed in the heating oven 8 and heated at 370° C. for 30 min.

The columnar member 19 and tubular member 20 were both heated in the heating process and underwent different degrees of dimensional expansion, thereby narrowing the gap between the two members, owing to the difference in coefficients of thermal expansion between them. The heating also caused a decline in the viscosity of the PEEK constituting the base. At the same time, the step or difference in level at the overlapping portion was eliminated and the film thickness was rendered uniform by the pressure developed between the columnar member 19 and tubular member 20. In addition, the fluoroplastic layer 23 was calcined to form a film.

The film 21 was extracted from between the columnar member 19 and tubular member 20 after cooling by a technique similar to that of the first embodiment. The result was a tubular film having an overall film thickness of 75 μm. The surface layer was fluoroplastic layer (PFA) having a thickness of 20 μm and the original difference in level at the portion were the opposing edges of the PEEK film overlapped each other was eliminated.

Fifth Embodiment

FIGS. 21 through 24 are diagrams illustrating a fifth embodiment of the invention.

This embodiment illustrates an example in a which fluoroplastic layer is provided on the inner peripheral surface of the cylindrically shaped article.

Figure 21:
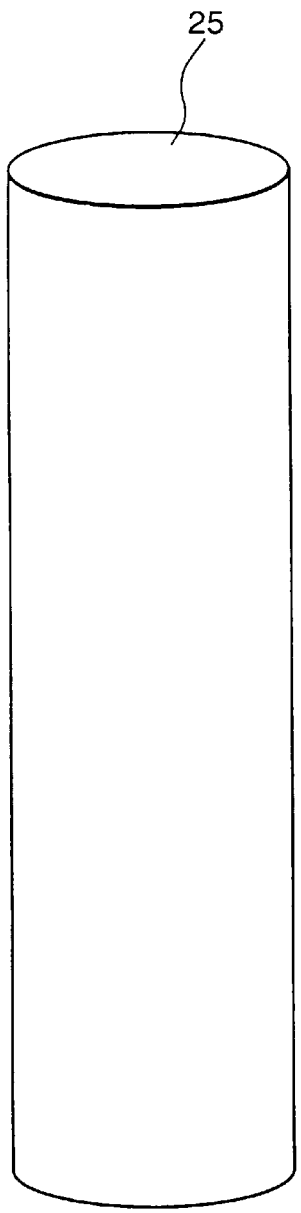
FIG. 21 is a diagram for describing a fifth embodiment of the present invention.
Figure 22:
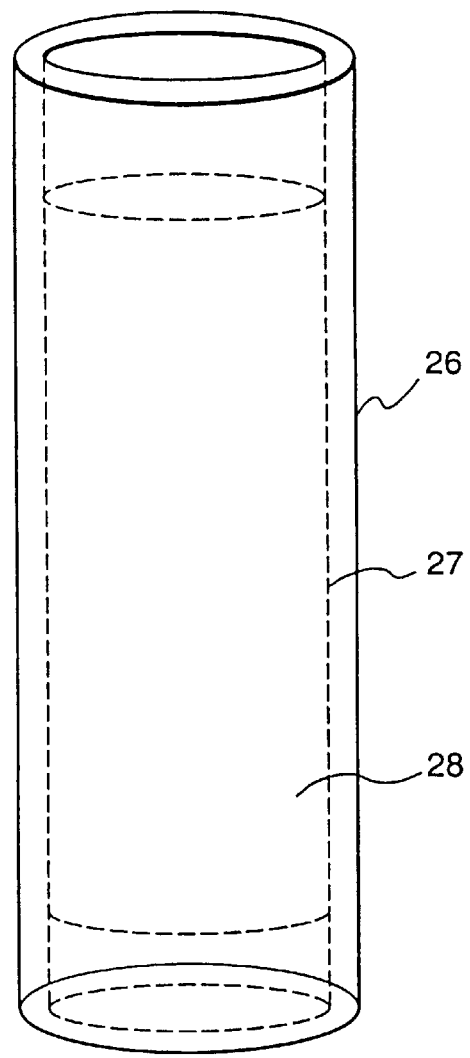
FIG. 22 is a diagram for describing a fifth embodiment of the present invention.
Figure 23:
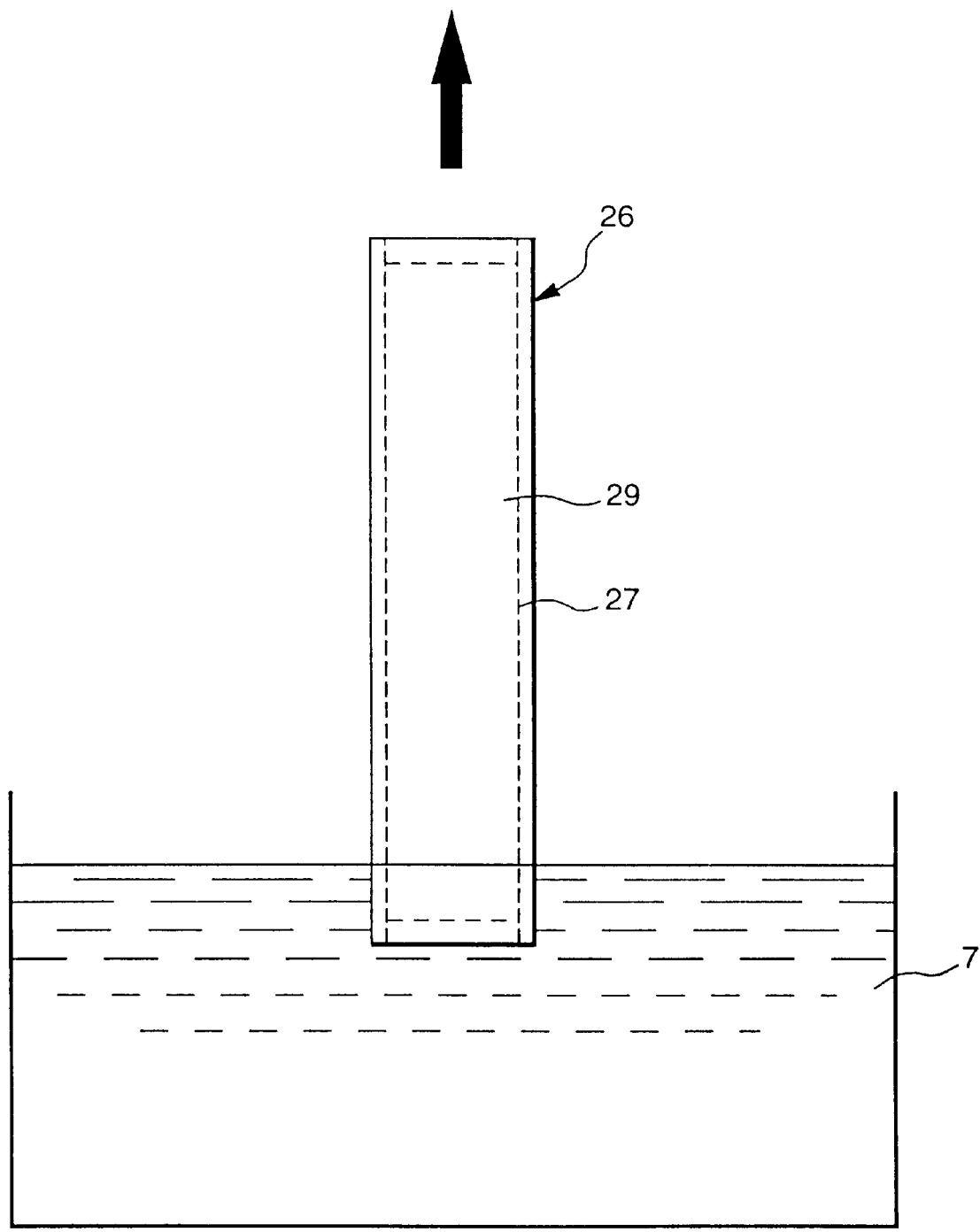
FIG. 23 is a diagram for describing a fifth embodiment of the present invention.

In FIGS. 21 and 22, numerals 25 and 26 denote a columnar member made of aluminum and a tubular member made of stainless steel, respectively. Both of these have coefficients of thermal expansion similar to those of the first embodiment. The outer and inner diameters of the columnar member 25 and tubular member 26, respectively, are designed in such a manner that the gap between these members will become 660 μm when they are heated to a temperature of 350° C.

Numeral 27 denotes a cylindrically shaped article (a resin tubular film) supported on the tubular member 26. The film consists of polyimide and has a thickness of 300 μm.

The inner peripheral surface 27a of the film 27 has been coated with a fluoroplastic primer 28 to a thickness of 10 μm so that the total thickness is 310 μm.

First, as shown in FIG. 22, the polyimide film 27 was inserted into tubular member 26. Next, the inner peripheral surface of the film 27 was coated, by means of the dip coating device 7, with a dispersion of fluoroplastic particles (PFA). This was followed by drying for 30 min. at a temperature of 150° C. The thickness of the fluoroplastic layer 29 thus formed was 20 μm.

Figure 24:
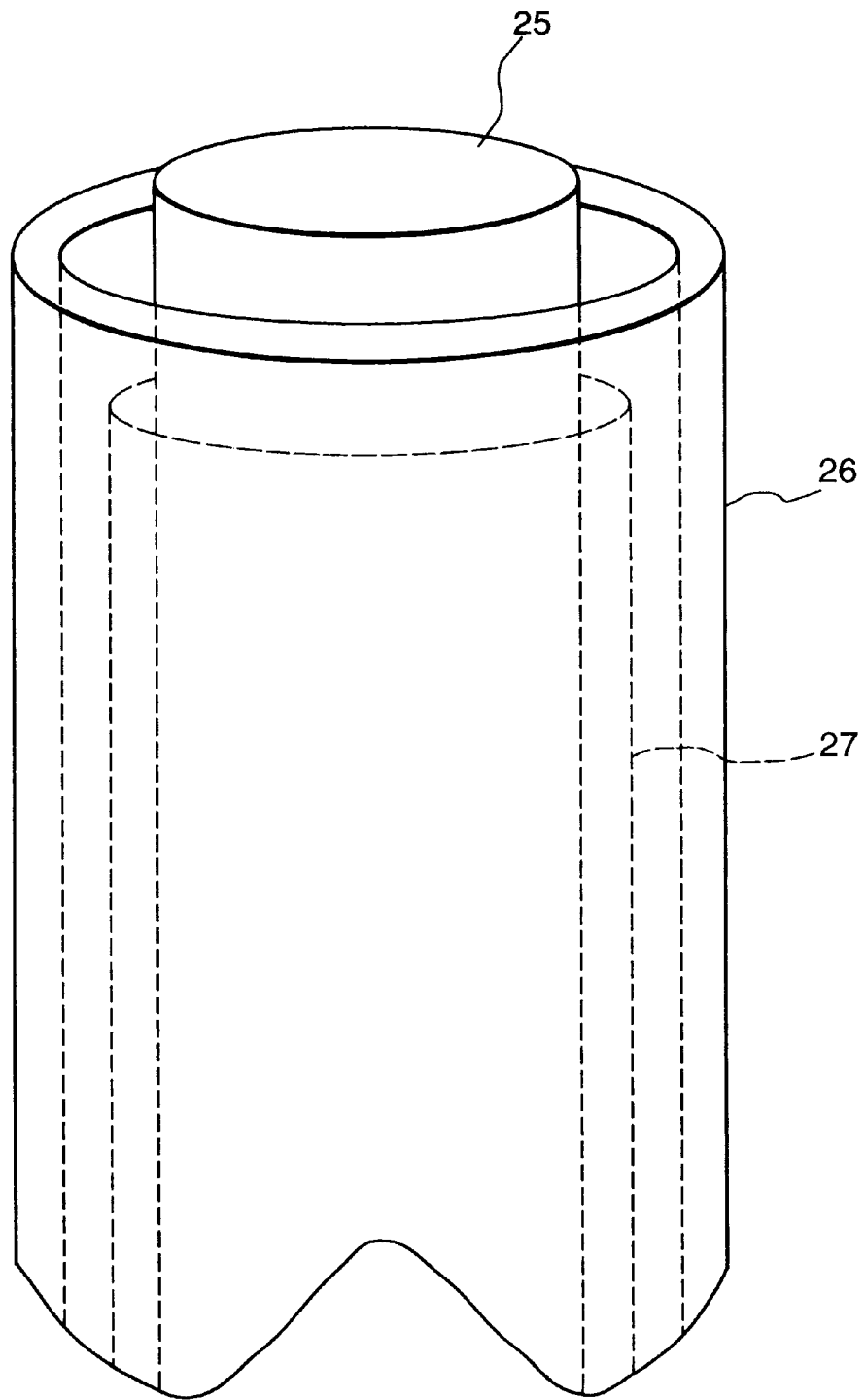
FIG. 24 is a diagram for describing a fifth embodiment of the present invention.

Furthermore, the columnar member 25 was inserted into the film 27 on which the fluoroplastic layer 29 was formed and the tubular member 26, as illustrated in FIG. 24.

Next, the columnar member 25, the film 27 and the tubular member 26 were placed in the heating oven 8 and heated at 350° C. for 30 min.

The columnar member 25 and tubular member 26 were both heated in the heating process and underwent different degrees of dimensional expansion, thereby narrowing the gap between them the two members, owing to the difference in coefficients of thermal expansion between them.

The fluoroplastic layer 29 was calcined into a film and the thickness of the tubular film 27 was rendered uniform owing to heating and the pressure applied by the columnar member 25 and tubular member 26.

The film 27 was extracted from between the columnar member 25 and tubular member 26 after cooling by a technique similar to that of the first embodiment. The result was a tubular film 27 the inner peripheral surface of which was coated with a fluoroplastic layer (PFA) having a thickness of 10 μm.

The present invention can be modified in various ways within the scope of the claims. For example, though a case has been described in which a cylindrically shaped article is coated with a fluoroplastic, this does not impose a limitation upon the invention. The invention is applicable also to cases in which a cylindrically shaped article is coated with another thermoplastic resin layer.

Thus, as set forth above, the present invention relates to a method of coating at least one of the inner peripheral surface and outer peripheral surface of a hollow cylindrically shaped article with a fluoroplastic layer. The method includes coating the outer peripheral surface of the cylindrically shaped article supported on a columnar member with a dispersion of fluoroplastic particles, drying and removing the solvent as necessary, fitting a tubular member over the columnar member and cylindrically shaped article, and then heating at least the columnar member, thereby making it possible to calcine a fluoroplastic film on the outer peripheral surface of the cylindrically shaped article.

In another embodiment, the method includes coating the inner peripheral surface of a cylindrically shaped article supported on a tubular member with a dispersion of fluoroplastic particles, drying and removing the solvent as necessary, inserting a columnar member into the interior of the tubular member and cylindrically shaped article, then heating at least the columnar member thereby making it possible to calcine the fluoroplastic film on the inner peripheral surface of the cylindrically shaped article.

Either of these methods makes it possible to apply a coating of a fluoroplastic layer on a resin which, owing to its thermal resistance characteristic, could not be coated with the fluoroplastic layer heretofore.

Further, the surface shape of the outer peripheral surface of the columnar member or the surface shape of the inner peripheral surface of the tubular member is transferred to the formed fluoroplastic layer so that the surface shape of the fluoroplastic layer may be designed as desired. As a result, it is possible to manipulate the fluoroplastic layer to the desired surface shape.

In particular, making the surface roughness Rz of the inner peripheral surface of the tubular member less than 3 μm and transferring the surface shape to the fluoroplastic layer makes it possible to obtain a desired surface roughness for the fluoroplastic layer in a case where it is used as the fixing film of an image forming apparatus.

Further, by using the inventive cylindrically shaped article with the fluoroplastic layer on its outer peripheral surface in a fixing roller or fixing film serving as the fixing member of an image forming apparatus, a fixing device having an outstanding fixing performance can be obtained.

Further, the tubular film obtained by each of the foregoing embodiments according to the invention is capable of functioning as a belt member for conveyance purposes.

The present invention is not limited to the above embodiments and various changes and modifications can be made within the spirit and scope of the present invention. Therefore, to apprise the public of the scope of the present invention, the following claims are made.

What is claimed is:

1. A cylindrically shaped article, to be used as a fixing film for an image forming apparatus, manufactured by coating an outer peripheral surface of a cylindrically shaped article which is made of polyimide or polyether ether ketone or polyether sulfone and is supported on a columnar member with particles of fluoroplastic resin, fitting a tubular molding member over said cylindrically shaped article coated with a film of said particles of fluoroplastic resin, and heating at least said columnar member, whereby the film of fluoroplastic resin particles is pressurized between said columnar member and said tubular molding member under a temperature at which the film of fluoroplastic resin particles is calcined to form a fluoroplastic resin film, and the surface shape of the outer peripheral surface of said columnar member and the surface shape of the inner peripheral surface of said tubular molding member are transferred to said fluoroplastic resin film, wherein at least one of (a) the outer peripheral surface of the columnar member and (b) the inner peripheral surface of the tubular molding member has a cross point mean surface roughness Rz of 3 $\mu$m or less, and wherein the fluoroplastic resin layer has a film thickness of 20 $\mu$m or less.

2. The article according to claim 1, wherein said cylindrically shaped article is a resin film.

3. The article according to claim 2, wherein said resin film has a thickness of 500 $\mu$m or less.

4. The article according to claim 2, wherein a layer of bonding agent is provided between said resin film and said fluoroplastic resin layer.

5. The article according to claim 1, wherein said columnar member has a coefficient of thermal expansion greater than that of said tubular molding member.

6. The article according to claim 1, wherein a method of spray coating, dip coating or spin coating a dispersion of said particles of fluoroplastic resin is used as a method of applying the coating of said fluoroplastic resin.

7. A cylindrically shaped article, to be used as a fixing film for an image forming apparatus, manufactured by coating an inner peripheral surface of a cylindrically shaped article which is made of polyimide or polyether ether ketone or polyether sulfone and is supported on a tubular molding member with particles of fluoroplastic resin, inserting a columnar member into said cylindrically shaped article coated with a film of said particles of fluoroplastic resin, and heating at least said columnar member, whereby the film of fluoroplastic resin particles is pressurized between said columnar member and said tubular molding member under a temperature at which the film of fluoroplastic resin particles is calcined to form a fluoroplastic resin film, and the surface shape of the outer peripheral surface of said columnar member and the surface shape of the inner peripheral surface of said tubular molding member are transferred to said fluoroplastic resin film, wherein at least one of (a) the outer peripheral surface of the columnar member and (b) the inner peripheral surface of the tubular molding member has a cross point mean surface roughness Rz of 3 $\mu$m or less, and wherein the fluoroplastic resin layer formed has a film thickness of 20 $\mu$m or less.

8. The article according to claim 7, wherein said cylindrically shaped article is a resin film.

9. The article according to claim 8, wherein said resin film has a thickness of 500 $\mu$m or less.

10. The article according to claim 8, wherein a layer of bonding agent is provided between said resin film and said fluoroplastic resin layer.

11. The article according to claim 7, wherein said columnar member has a coefficient of thermal expansion greater than that of said tubular molding member.

12. The article according to claim 7, wherein a method of spray coating, dip coating or spin coating a dispersion of said particles of fluoroplastic resin is used as a method of applying the coating of said fluoroplastic resin.

* * * * *

UNITED STATES PATENT AND TRADEMARK OFFICE
CERTIFICATE OF CORRECTION

PATENT NO. : 5,968,623
DATED : October 19, 1999
INVENTOR(S) : KAZUTAKA TAKEUCHI, et al.

It is certified that error appears in the above-identified patent and that said Letters Patent is hereby corrected as shown below:

Cover Page - Item [73], Assignee

"Canon Kabushiki Kaisha, Japan" should read --Canon Kabushiki Kaisha, Tokyo, Japan--.

COLUMN 1

Line 50 of the text, "above" should read --above have--.

COLUMN 3

Line 30 of the text, "make" should read --makes--;

Line 56 of the text, "a" should be deleted; and

Line 57 of the text, "ment" should read --ments--.

UNITED STATES PATENT AND TRADEMARK OFFICE
CERTIFICATE OF CORRECTION

PATENT NO. : 5,968,623
DATED      : October 19, 1999
INVENTOR(S): KAZUTAKA TAKEUCHI, et al.

Sheet 2 of 2

It is certified that error appears in the above-identified patent and that said Letters Patent is hereby corrected as shown below:

COLUMN 4

Line 48 of the text, "rough;" should read --rough; and--.

COLUMN 11

Line 46 of the text, "them" should be deleted.

Signed and Sealed this

Tenth Day of April, 2001

Attest:

NICHOLAS P. GODICI

Attesting Officer    Acting Director of the United States Patent and Trademark Office